United States Patent [19]
Pollock

[11] Patent Number: 5,927,232
[45] Date of Patent: Jul. 27, 1999

[54] POULTRY FEEDER

[75] Inventor: Eugene B. Pollock, County of Shelby, Ill.

[73] Assignee: GSI Group, Inc., Assumption, Ill.

[21] Appl. No.: 08/916,522

[22] Filed: Aug. 22, 1997

[51] Int. Cl.$^6$ .............................................. A01K 39/012
[52] U.S. Cl. ........................................... 119/53; 119/57.4
[58] Field of Search ............................ 119/52.4, 53, 57.4

[56] References Cited

U.S. PATENT DOCUMENTS

| | | |
|---|---|---|
| 984,980 | 2/1911 | Taylor . |
| 1,154,073 | 9/1915 | Stocking . |
| 1,855,781 | 4/1932 | Tolley . |
| 1,862,349 | 6/1932 | Perry . |
| 1,864,569 | 6/1932 | Willauer . |
| 2,515,698 | 7/1950 | Cosby .......................................... 119/53 |
| 3,033,163 | 5/1962 | Hostetler et al. . |
| 3,105,463 | 10/1963 | Pilch ...................................... 119/53 X |
| 3,230,933 | 1/1966 | Myers et al. ............................... 119/53 |
| 3,388,690 | 6/1968 | Hostetler ................................... 119/53 |
| 3,415,228 | 12/1968 | Myers ................................... 119/51.11 |
| 3,511,215 | 5/1970 | Myers ....................................... 119/53 |
| 3,598,087 | 8/1971 | Ramser ................................ 119/51.11 |
| 3,742,913 | 7/1973 | Crippen ................................ 119/51.11 |
| 3,811,412 | 5/1974 | Murto et al. ............................... 119/53 |
| 3,971,340 | 7/1976 | Allen .................................... 119/53 X |
| 4,070,990 | 1/1978 | Swartzendruber ......................... 119/53 |
| 4,348,988 | 9/1982 | Lawson ..................................... 119/53 |
| 4,476,811 | 10/1984 | Swartzendruber .................... 119/53 X |

(List continued on next page.)

FOREIGN PATENT DOCUMENTS 449823  1/1926  Germany ................................ 119/61

OTHER PUBLICATIONS

Big Dutchman Broiler Feeder Brochure.
Chore–Time Catalog "Breeder Pullet Feeding System".
Chore–Time Catalog "Now . . . There Is A New Way To Feed Turkey Poults".
"The Chore–Time Advantage For Breeders" Model C2 Feeder p. 4.
Chore–Time Brochure Model C Breeder Feeder.
"Chore–Time Program Feeder" Model H Feeder.
Chore–Time Facts Sheet—Model H and CT.
Cumberland Catalog—"Grilless Pan Feeding Systems".
Sipco Brochure.
Cablevey Brochure.
PEC Brochure.
Lohmann Anlagenbau Brochure.
Hart Mfg. Co., Glendale, California Pan Feeding Systems.

*Primary Examiner*—Robert P. Swiatek
*Attorney, Agent, or Firm*—Polster, Lieder, Woodruff, Luccesi

[57] ABSTRACT

A poultry feeder (1) having a drop tube or main body (7) for receiving feed from a source of feed (FC). A feed pan (5) is carried by the drop tube which receives feed for consumption by poultry. The feed pan has an outer rim (11), an outer portion spaced inwardly of the rim and an inner portion between the drop tube and the outer portion. The drop tube (7) has at least one aperture (21a–21c) therein spaced above the feed pan through which all of the feed from the drop tube is discharged for delivery to the feed pan. A first feed path (FP1) has an inlet (57a–57c) for receiving feed discharged from the at least one aperture (21a–21c) and an outlet (the open bottom of cover 33) for discharging into the inner portion of the feed pan and a second feed path (FP2) having an inlet (53a–53c) for receiving feed discharged from the at least one aperture (21a–21c) and a second outlet (55a–55c) for discharging feed into the outer portion of the feed pan. The second outlet (55a–55c) of the second feed path (FP2) is disposed above the level of the first outlet (the open bottom of cover 33) of the first feed path (FP1) thereby to permit filling of the feed pan (5) to a greater extent than when feed is discharged from the outlet end of the first feed path, and means (33) for selectively controlling the flow of feed from either the first feed flow path or from the second feed flow path.

18 Claims, 14 Drawing Sheets

U.S. PATENT DOCUMENTS

| | | | |
|---|---|---|---|
| 4,527,513 | 7/1985 | Hart et al. | 119/51.5 |
| 4,552,095 | 11/1985 | Segalla | 119/53 |
| 4,800,844 | 1/1989 | Van Gilst | 119/51.5 |
| 4,834,026 | 5/1989 | Brembeck et al. | 119/53 |
| 4,995,343 | 2/1991 | Cole et al. | 119/53 |
| 5,007,380 | 4/1991 | Badia et al. | 119/53 |
| 5,092,274 | 3/1992 | Cole et al. | 119/57.4 |
| 5,113,797 | 5/1992 | van Daele | 119/53 |
| 5,184,570 | 2/1993 | Hostetler | 119/72 |
| 5,275,131 | 1/1994 | Brake et al. | 119/63 |
| 5,462,017 | 10/1995 | Pollock et al. | 119/57.4 |
| 5,497,730 | 3/1996 | van Daele et al. | 119/53 |

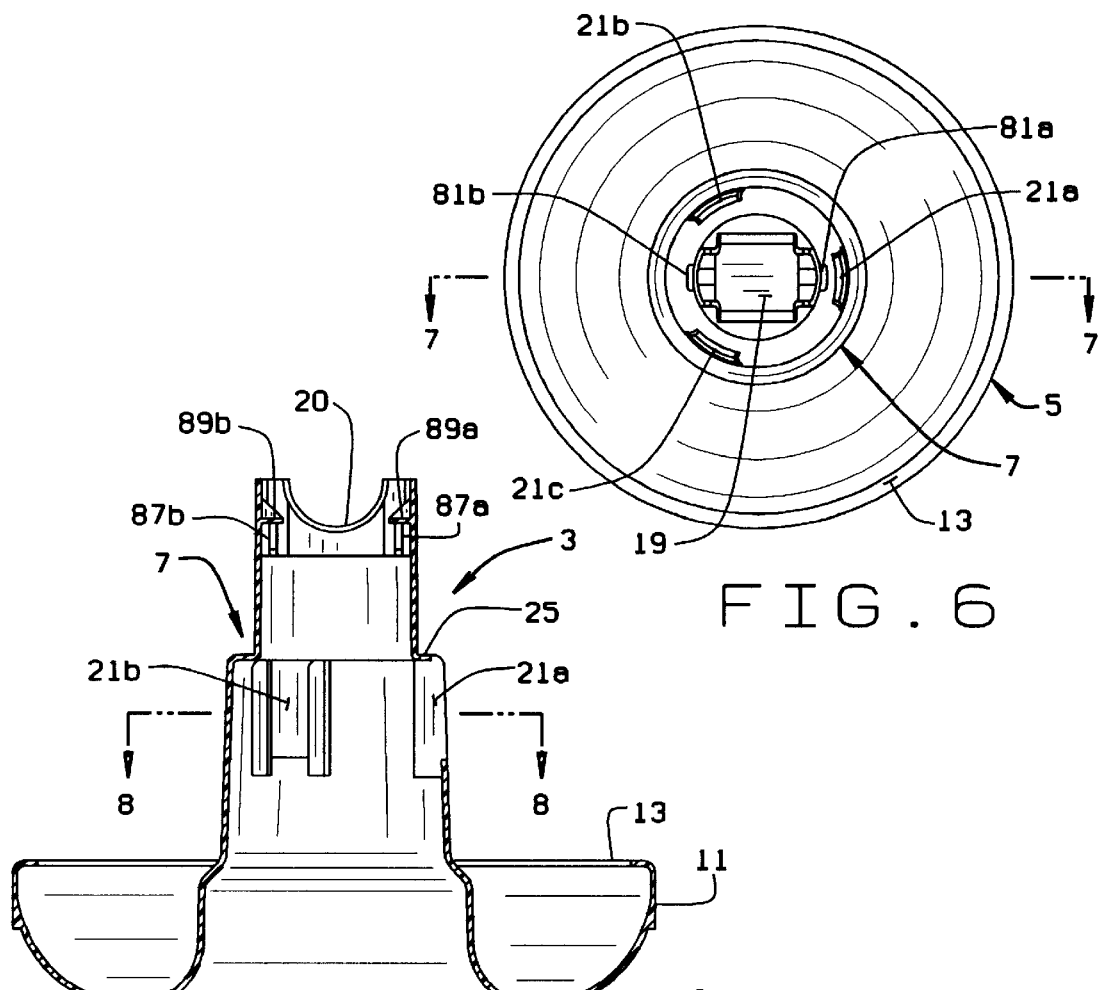
FIG. 6
FIG. 7
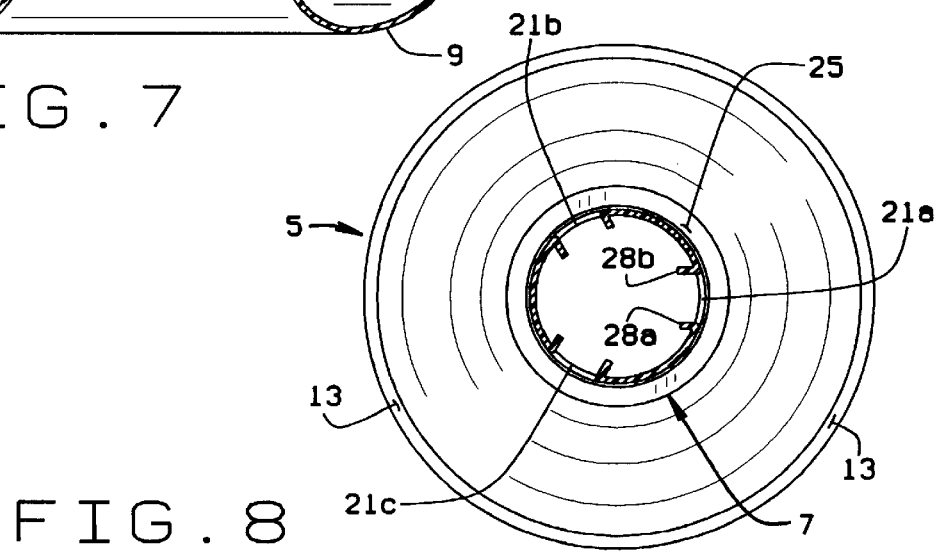
FIG. 8

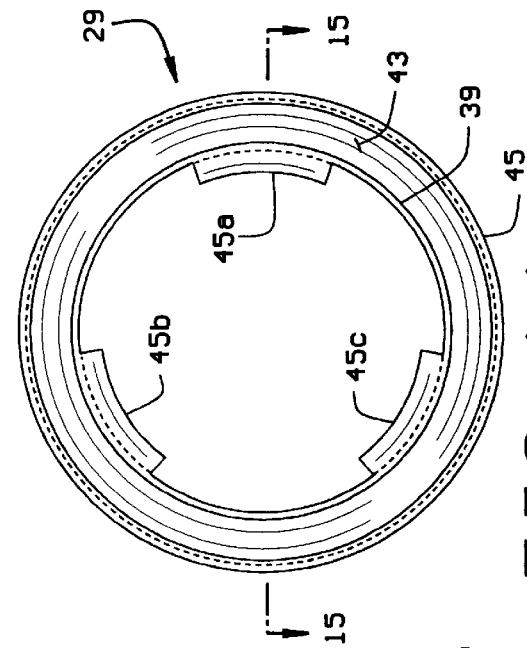
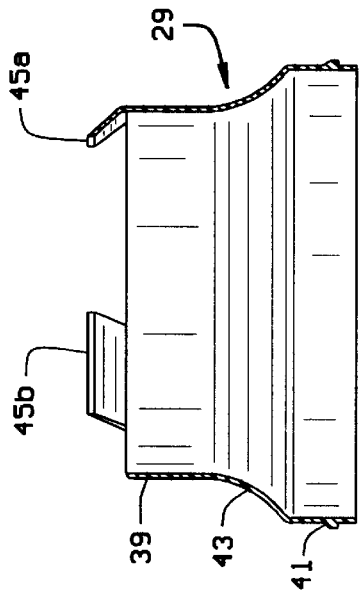
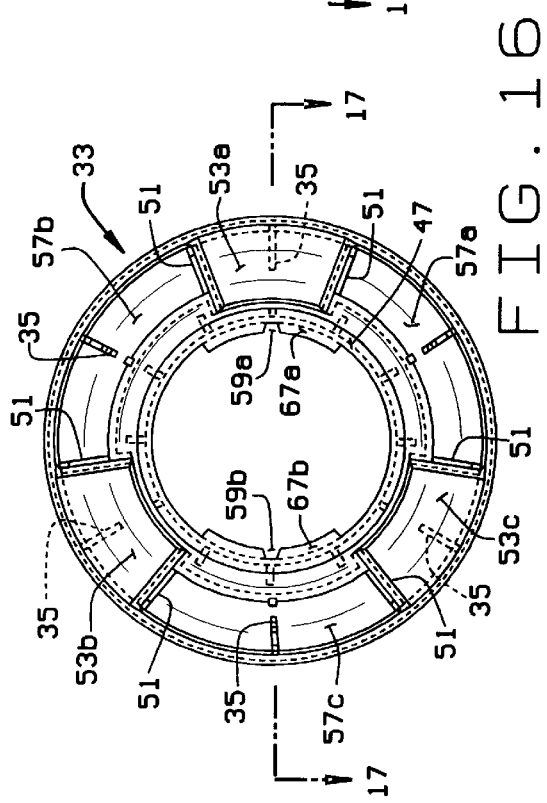
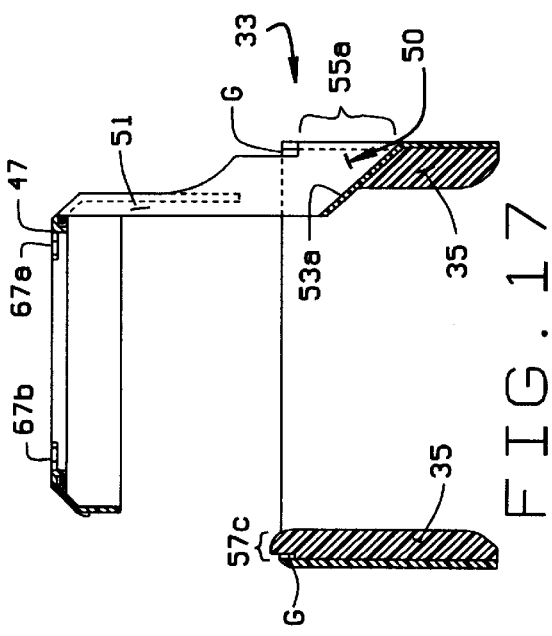

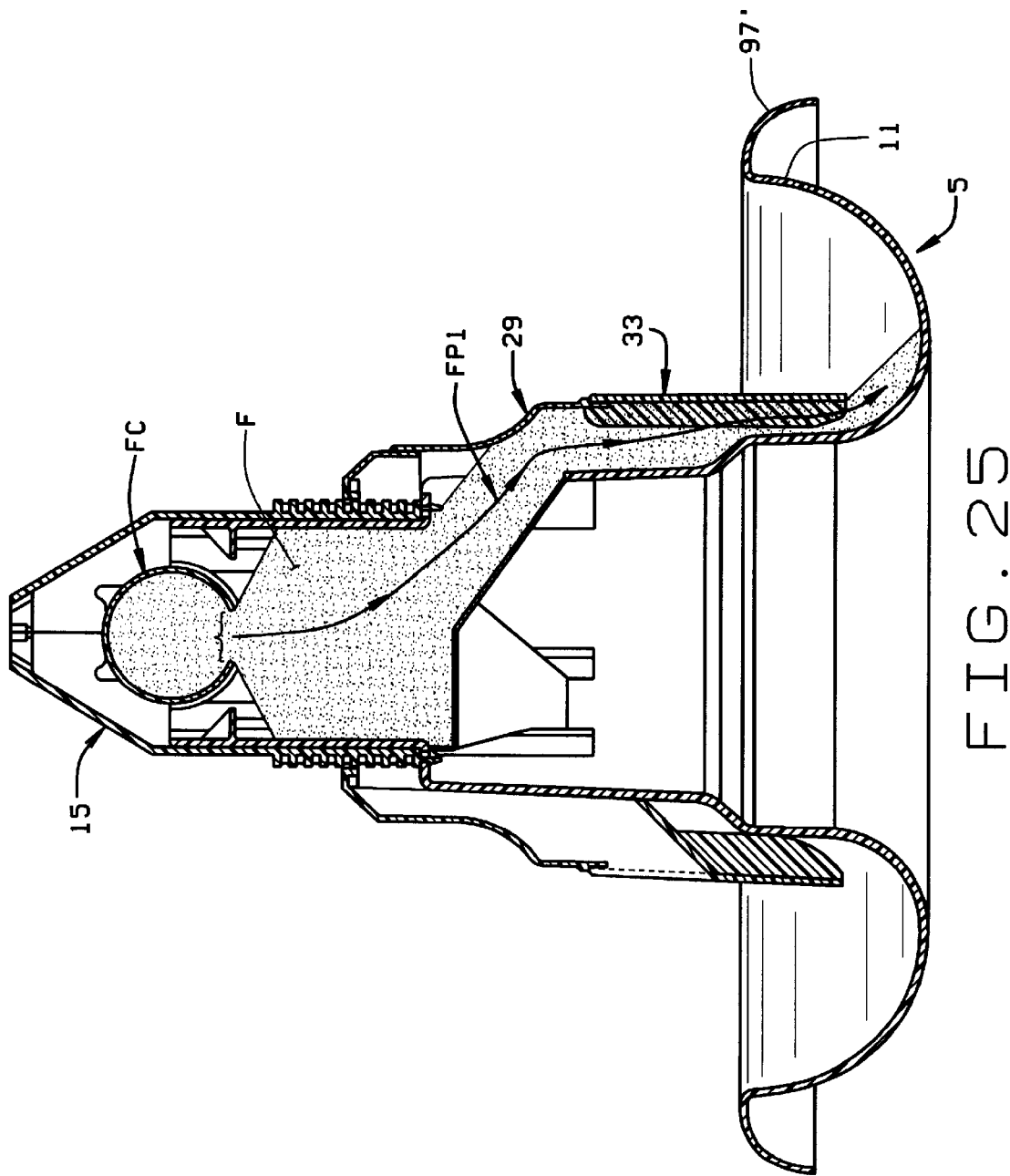

POULTRY FEEDER

SEQUENCE LISTING

Not applicable.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

This invention relates to a poultry feeder for feeding birds raised in a poultry house where feed is supplied to a multiplicity of feeders by means of a feed conveyor conveying feed from a bulk feed tank or the like located outside the house to the feeder. Typically, such poultry houses will confine tens of thousands of birds. In the case of chickens, day old chicks are introduced into the house and are raised in the house throughout the growth cycle until ready for market. In the case of turkeys, the birds may be moved from house to house as the birds grow from chicks to poults to adult birds.

There has been a long-standing need for a poultry feeder, particularly for larger birds such as larger turkey poults and adult turkeys, which presents a minimum quantity of feed in the feed pan so as to prevent spoilage or wastage of the feed, but which continuously replenishes this smaller supply of feed in the feed pan between operating cycles of the feed conveyor. There has also been a need for such a feeder that can discharge greater quantities of feed into the feed pan, (sometimes referred to as flooding the feed pan), particularly upon introduction of the younger birds in the house so that the younger birds may more readily see the feed in the feed pan of the feeder and may have more ready access to the feed and then change to the above-described lesser quantity of feed presented in the feed pan as the birds grow in size. There has also been a need for a truly "grill-less" feeder which has no obstructions in the feed pan which may take up space and thus inhibit the birds from eating or which may prevent the maximum number of birds from eating from the feed pan.

Reference may be made to U.S. Pat. No. 4,476,811 which shows a poultry feeder having a drop tube affixed to a feed conveyor tube for receiving feed therefrom. Upon the introduction of small chicks into the poultry house, this feeder is adjusted to discharge the feed from so-called flood windows located in the drop tube considerably above the level of the feed pan. In this manner a large quantity of feed is dispensed into the feed pan so as to flood the feed pan thus enabling the small chicks to see the feed and to consume the feed. Upon the chicks growing in size, the feeder is changed from the above-described flood condition in which feed is dispensed from the flood windows, to a normal feeding condition in which the flood windows are closed or blocked and in which feed is dispensed from the open bottom end of the drop tube so as to present a small quantity of feed within the feed pan. U.S. Pat. Nos. 5,092,274 and 5,113,797 show similar flood-type feeders.

The feeder described in the co-assigned U.S. Pat. No. 5,462,017, which is commercially sold under the trademark HI-LO, was introduced to overcome certain shortcomings of such flood-type feeders by providing a feed pan which may be selectively adjusted between a shallow pan position in which the young chicks may more readily see the feed presented within the feed pan thus eliminating the need for flooding the feed pan with feed. By eliminating the need to flood the feed pan with excess feed which was oftentimes wasted or became spoiled before it was consumed with the birds, it was found that the birds actually matured in less time (the grow out period was shortened) and less feed was required to raise a bird to its target market weight. In the use this feeder, upon the young chicks growing in height a sufficient amount (usually at about 10 days into the growth cycle), the feeders would be adjusted from the above-described shallow depth feed pan position to a deeper depth position such that the increased height of the rim of the feed pan would better contain the feed and would prevent the now larger birds from wasting the feed by raking or billing the feed from the feed pan which would be then dropped onto the floor of the poultry house and wasted.

As will be noted in many of the above-noted patents, these feeders are so-called grill-type feeders because they have a grill (of either wire or plastic construction) joining the outer margin of the feed pan to the central drop tube. While in many instances these grills do serve a useful function (i.e., they prevent excessive numbers of birds from attempting to feed from a single feeder at the same time and the spacing of the grill bars may be preset in breeding poultry houses such the cockerels which have larger heads are prevented from feeding from feeders intended for the hens), there were many instances where a grilless feeder would be desirable. It will be noted that if a grill-less feeder is provided, the amount of feed and the number of birds may maximized for each feeder. This translates to possibly fewer feeders being required to support a flock within a poultry house and in more feed being presented to the birds.

For larger birds, such as adult turkeys, it is important that the feeder present the maximum amount of feed and that the feeder be of rugged and simple construction so as to have a long service life within the poultry house.

BRIEF SUMMARY OF THE INVENTION

Among the several objects and features of this invention may be noted the provision of a feeder which may be readily adjusted so as to dispense a relatively small quantity of feed into the feed pan of the feeder and to continuously replenish such feed so as to maintain a substantially constant amount of feed in the feed pan as the feed is consumed between cycles of the feed conveyor which deliver more feed to the feeder;

The provision of such a feeder which may be selectively adjusted so as to substantially flood the feed pan with feed thereby to make it easier for young birds to see the feed within the feed pan;

The provision of such a feeder which is grilless;

The provision of such a feeder in which the feed pan is integral with the main body of the feeder;

The provision of such a feeder which has a bumper on the feed pan which protects the birds against impact injury such as may be caused by birds bumping into the feed pan while in an excited state;

The provision of such a feeder which is easy to adjust so as to switch the delivery of feed from a first feed flow path in which a relatively small quantity of feed is delivered into the inner portion of the feed pan and a second feed flow path in which feed may be delivered into the outer reaches of the feed pan;

The provision of such a feeder in which several of the feeders along with their feed pans may be at least in part nested one within the other so as to conserve space during shipping;

The provision of such a feeder which may be readily adjusted in either its above-said first or second feed flow paths so as to control the amount of feed discharged into the feed pan; and The provision of such a feeder which is of rugged and economical construction, which is easy to use and clean, and which has a long service life in a poultry house or the like.

Briefly stated, a poultry feeder of the present invention is adapted to be installed on a feed conveyor tube of a feed conveyor with the feed conveyor delivering feed to the feeder. The feeder has a generally vertically extending main body (or drop tube) which receives the feed conveyor tube with the later having an opening therein for the delivery of the poultry feed into the main body of the feeder. The feeder further has a feed pan carried by the main body for receiving the poultry feed therein and for allowing poultry to consume the poultry feed from the feed pan. The feeder further has a diverter located within the main body below the feed conveyor tube for directing all of the poultry feed discharged from the feed conveyor tube into the main body outwardly toward at least one feed outlet window in the main body. A cover having an open bottom is spaced radially outwardly of the main body and defines a vertically extending annular space between the main body and the cover for directing the gravity flow of the feed discharged from the at least one window downwardly within the annular space for discharge from the open bottom of the cover into the feed pan proximate the inner reach of the feed pan adjacent the main member.

Alternatively, a poultry feeder of the present invention has a drop tube or main body for receiving feed. A feed pan is carried by the drop tube which receives feed for consumption by poultry. The feed pan has an outer rim, an outer portion spaced inwardly of the rim, and an inner portion between the drop tube and the outer portion. The drop tube has at least one aperture therein spaced above the feed pan through which all of the feed from the drop tube is discharged for delivery to the feed pan. A first feed path has an inlet for receiving feed discharged from the at least one aperture and an outlet for discharging into the inner portion of the feed pan and a second feed path having an inlet for receiving feed discharged from the at least one aperture and a second outlet for discharging feed into the outer portion of the feed pan. The second outlet of the second feed path is disposed above the level of the first outlet of the first feed path thereby to permit filling of the feed pan to a greater extent than when feed is discharged from the outlet end of the first feed path, and means for selectively controlling the flow of feed from either the first feed flow path or from the second feed flow path.

Other objects and features will be in part apparent and in part pointed out hereinafter.

BRIEF DESCRIPTION OF THE SEVERAL VIEWS OF THE DRAWINGS

FIG. 6 is a top plan view of the feeder of the present invention on a somewhat smaller scale than FIG. 5 with the cover removed so as to illustrate the structure of the main body and the feed pan;

FIG. 7 is a vertical cross sectional view of the feeder taken along line 7—7 of FIG. 6 illustrating a one-piece main body and feed pan of the present invention;

FIG. 8 is cross sectional view taken along line 8—8 of FIG. 7 showing the relationship of the main body of the feeder and the feed pan;

FIG. 14 is a top plan view of an upper cover which surrounds the main body of the feeder and which forms a portion of both the first and the second feed paths as the feed flows outwardly and downwardly of the main body of the feeder for discharge in the feed pan;

FIG. 15 is a cross sectional view taken along line 15—15 of FIG. 14;

FIG. 16 is a top plan view of a lower cover having an upper portion which extends above and interiorly of the cover shown in FIGS. 14 and 15 and having a lower portion, the lower cover having alternating openings and inclined plates for directing the flow of feed from the main body into the feed pan when the feeder is in either its first or second feed dispensing position;

FIG. 17 is a vertical cross sectional view of the lower cover taken along line 17—17 of FIG. 16;

FIG. 25 is a view of a feeder similar to FIG. 5 showing an impact absorbing rim molded integrally with the feed pan.

Corresponding reference characters indicate corresponding parts throughout the several view of the drawings.

DETAILED DESCRIPTION OF THE INVENTION

Figure 1:
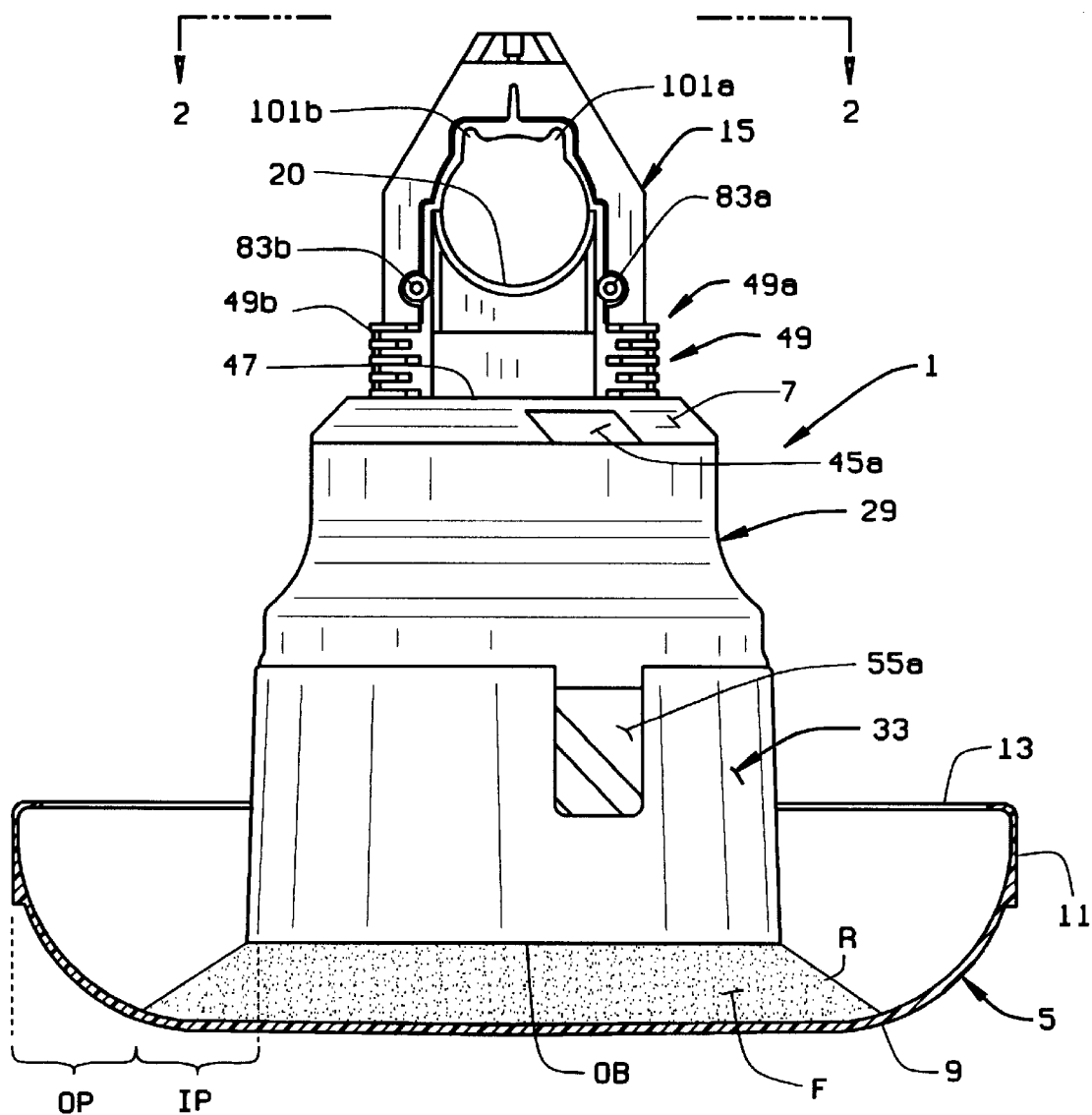
FIG. 1 is a side elevational view of a poultry feeder of the present invention having a feed pan with the latter shown in cross section and with the feeder shown in a first position so as to discharge feed from a first feed flow path into the feed pan thereby to present a small quantity of feed for consumption within the feed pan.

Referring now to the drawings, a feeder of the present invention is shown to be indicated in its entirety by reference character 1. Feeder 1 comprises a body 3 (as best shown in FIG. 7) comprising a feed pan 5 at the bottom thereof and a main body tube (also referred to as a drop tube) 7 located at the center of feed pan 5 and extending vertically upwardly. Feed pan 5 is shown to be molded integrally with the main body tube 7, but it will be understood that while this construction is preferred, it is not essential to the feeder of this invention.

Figure 2:
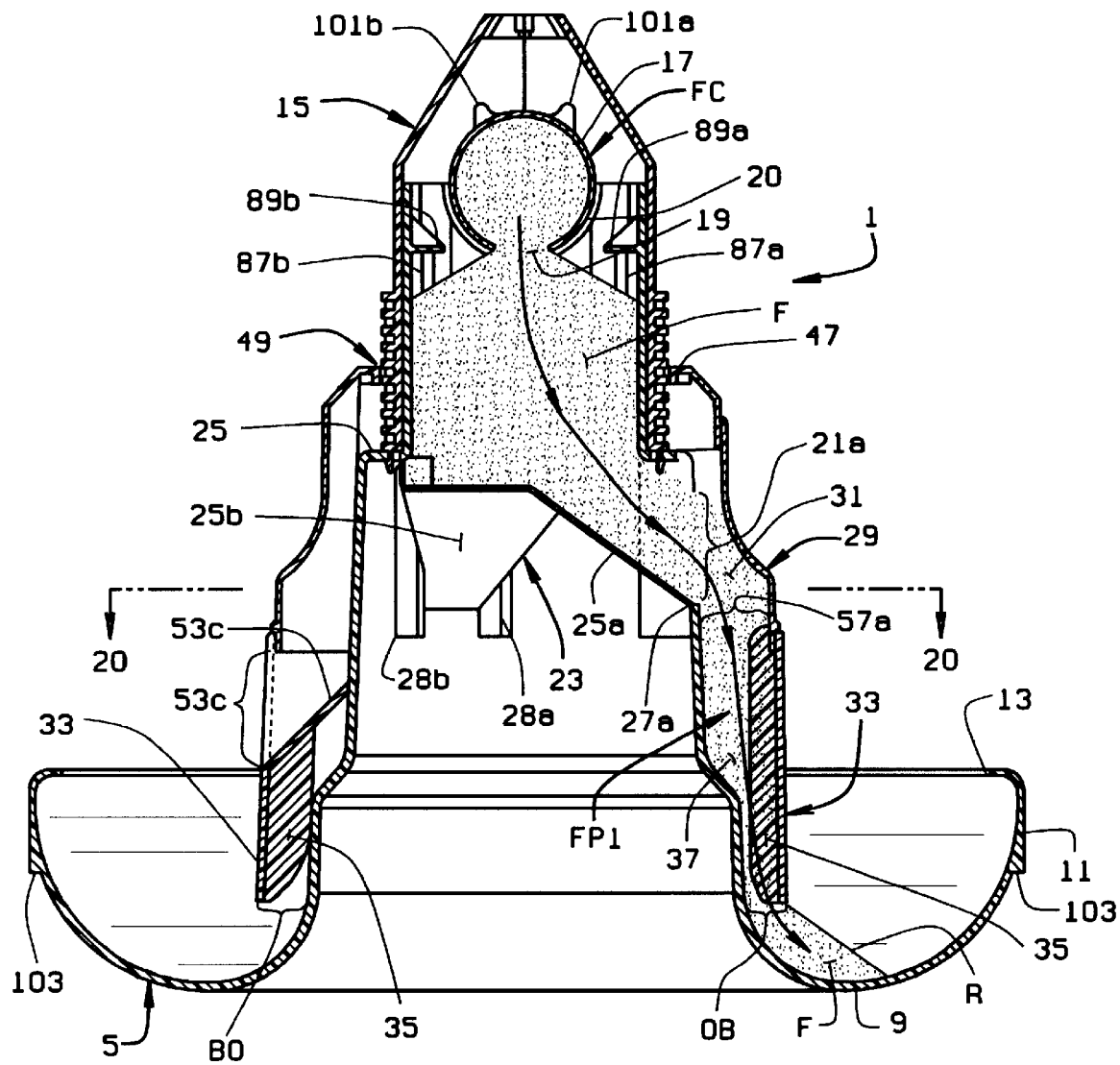
FIG. 2 is a vertical cross sectional view taken along line 2—2 of FIG. 1 illustrating the feeder in its first position for discharging feed via the first feed flow path in which feed from a feed conveyor is deposited in the main body of the feeder, in which the feed is discharged from apertures in the main body and is discharged into a vertical annular space between the main body and a cover surrounding the main body for discharge from the open bottom end of the cover into the inner reaches of the feed pan.

Feed pan 5 has a base 9 which is adapted to bear on the floor of the poultry house or the like and an upwardly curved outer wall or rim 11 extending up from base 9 so as to form a receptacle into which feed may be dispensed and from which birds within the poultry house may consume such feed. As indicated at 13, an inwardly extending anti-raking flange is formed on the upper edge of wall 11 so as to effectively prevent birds from raking or billing feed up the inside of the feed pan wall and scattering such feed on the floor of the poultry house thus wasting such feed. As shown in FIG. 2, main body tube 7 is open from the bottom of the feed pan for purposes as will appear.

Referring now to FIG. 1, feeder 1 has a connector 15 removably secured to the upper end of main body tube 7. Connector 15 receives a feed conveyor FC for supplying feed from a bulk source of feed (e.g., a bulk feed tank or the like located on the outside of the poultry house). As is typical, feed conveyor FC comprises a feed conveyor tube 17 and the feeder 1 of this invention is secured to such feed conveyor tube and is suspended therefrom. As is conventional, feed conveyor tube 17 houses a feed conveyor auger A (see FIG. 22) which conveys feed F axially through conveyor tube 17. Such feed conveyor augers are well known in the poultry feeder art and may either be rotary driven such that the auger acts as a screw conveyor or the auger may be axially propelled around a closed loop feed conveyor tube so as to drag feed axially through the feed conveyor tube. It will be understood that other types of feed conveyors (e.g. chain or cable conveyor systems) may be used as well. Whichever type of conveyor is used, the feed conveyor tube 17 has an opening 19 (see FIG. 2) formed therein (typically in its bottom reach) within connector 15 so that feed F conveyed through conveyor tube 17 will be discharged from the conveyor tube into feeder 1. The upper end of main body 3 has a pair of spaced, part circular shoulders 20 which receive a part of conveyor tube 17 and which define opening 19 therebetween for allowing feed from the conveyor tube to enter feeder 1.

Figure 4:
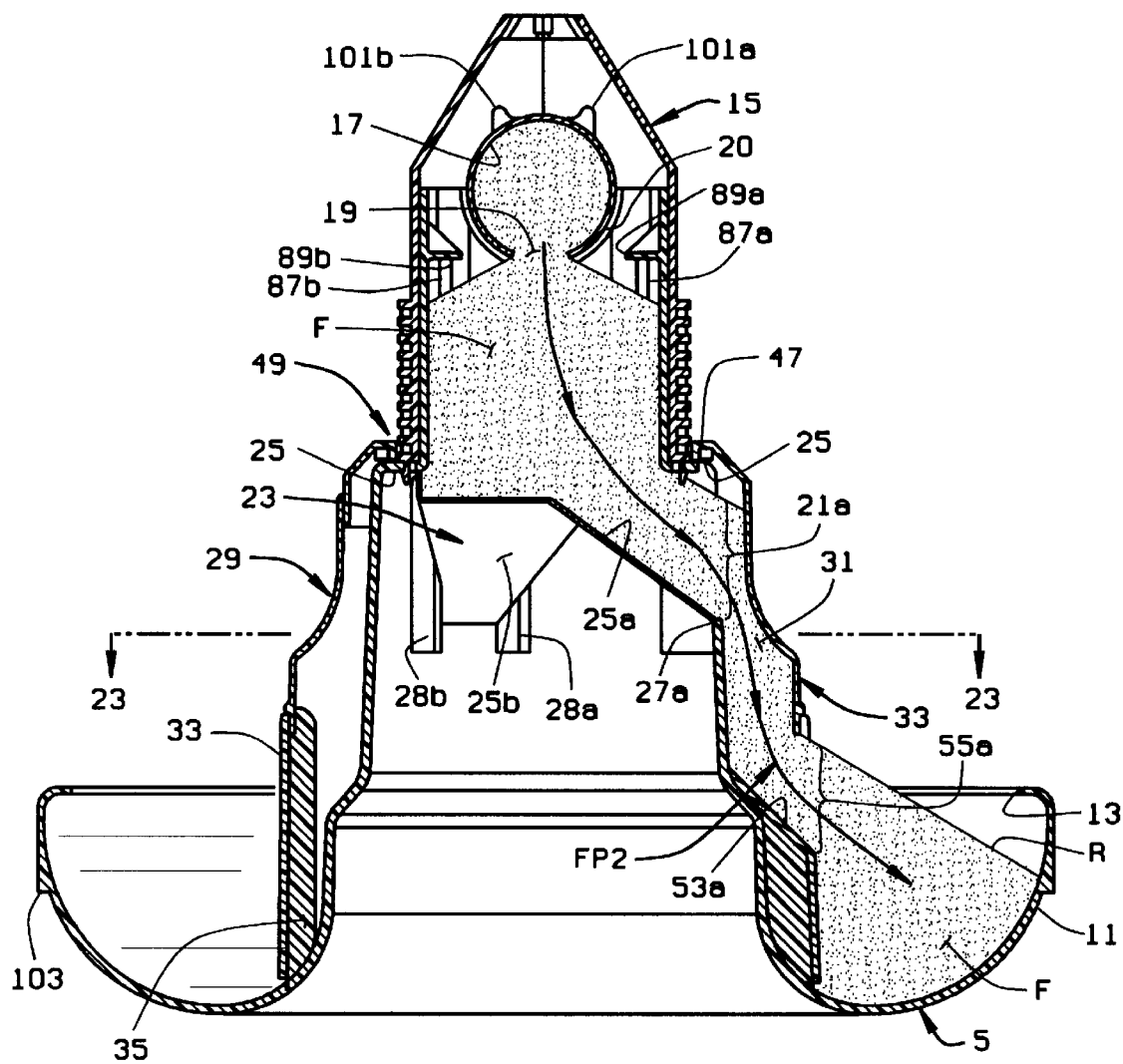
FIG. 4 is a vertical cross sectional view taken along line 4—4 of FIG. 3. illustrating the relative positions of the components of the feeder of the present invention when in a second position so as to discharge feed into the feed pan by way of the above-said second feed flow path.
Figure 12:
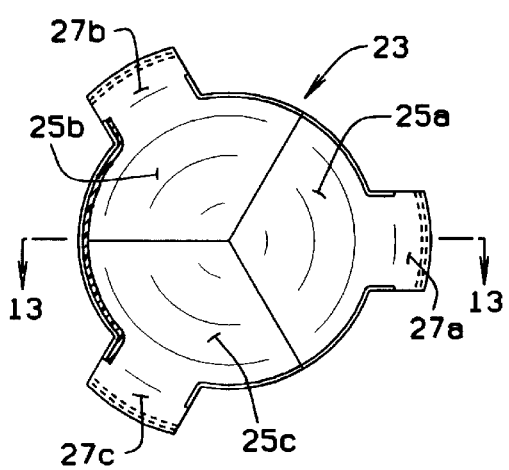
FIG. 12 is a top plan view of a feed diverter installed within the main body of the feeder of this invention for diverting feed discharged into the main body from the feed conveyor to apertures provided in the main body thereby to direct all feed from the main body for discharge into either of the above-said first or second feed flow paths.
Figure 13:
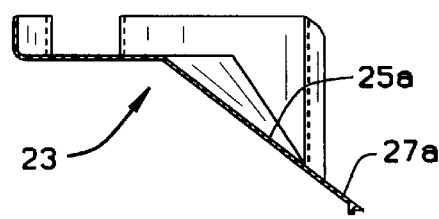
FIG. 13 is a cross sectional view of the diverter taken along line 13—13 of FIG. 12.

As shown in FIGS. 2 and 4, feed F discharged into feeder 1 from conveyor tube 17 flows downwardly from opening 19 into the hollow interior of connector 15 and into the hollow interior of main body tube 7. As best shown in FIGS. 6–8, the upper portion of main body tube 7 is provided with three apertures (also referred to as openings or windows), as indicated at 21a, 21b, and 21c, spaced at equally around the main body. A diverter plate 23 is inserted into the open bottom of main body tube 7 from below and snaps into place within main body tube 7 so as to be substantially at the level of apertures 21a–21c (see FIGS. 2 and 4). As shown in FIGS. 12 and 13, diverter plate 23 has a diameter sized to fit within main body tube 7 below a shoulder 25 provided in main body 3. Diverter plate 23 has three upwardly facing sloped surfaces 25a–25c with each of the sloped surfaces having a tab 27a–27c generally in register with a respective window or opening 21a–21c and with tabs 27a–27c extending out beyond the lower edge of its respective window when the diverter plate is snapped into position relative to main body tube 7. In this manner, feed F discharged from feed conveyor tube 17 via opening 19 will flow downwardly within connector 15 and within the upper reaches of main body tube 7 until encountering the sloped surfaces 25a–25c of diverter plate 23. The sloped surfaces of the diverter plate cause the feed to flow radially outwardly of the main body tube 7 through openings 21a–21c. Inwardly projecting walls 28a, 28b (see FIG. 2) are molded on main body tube 7 on either side of each window 21a–21c and cooperate with each respective sloped surfaces 25a–25c of diverter plate 23 so as to aid in securing and mounting the diverter plate within main body tube 7.

Figure 5:
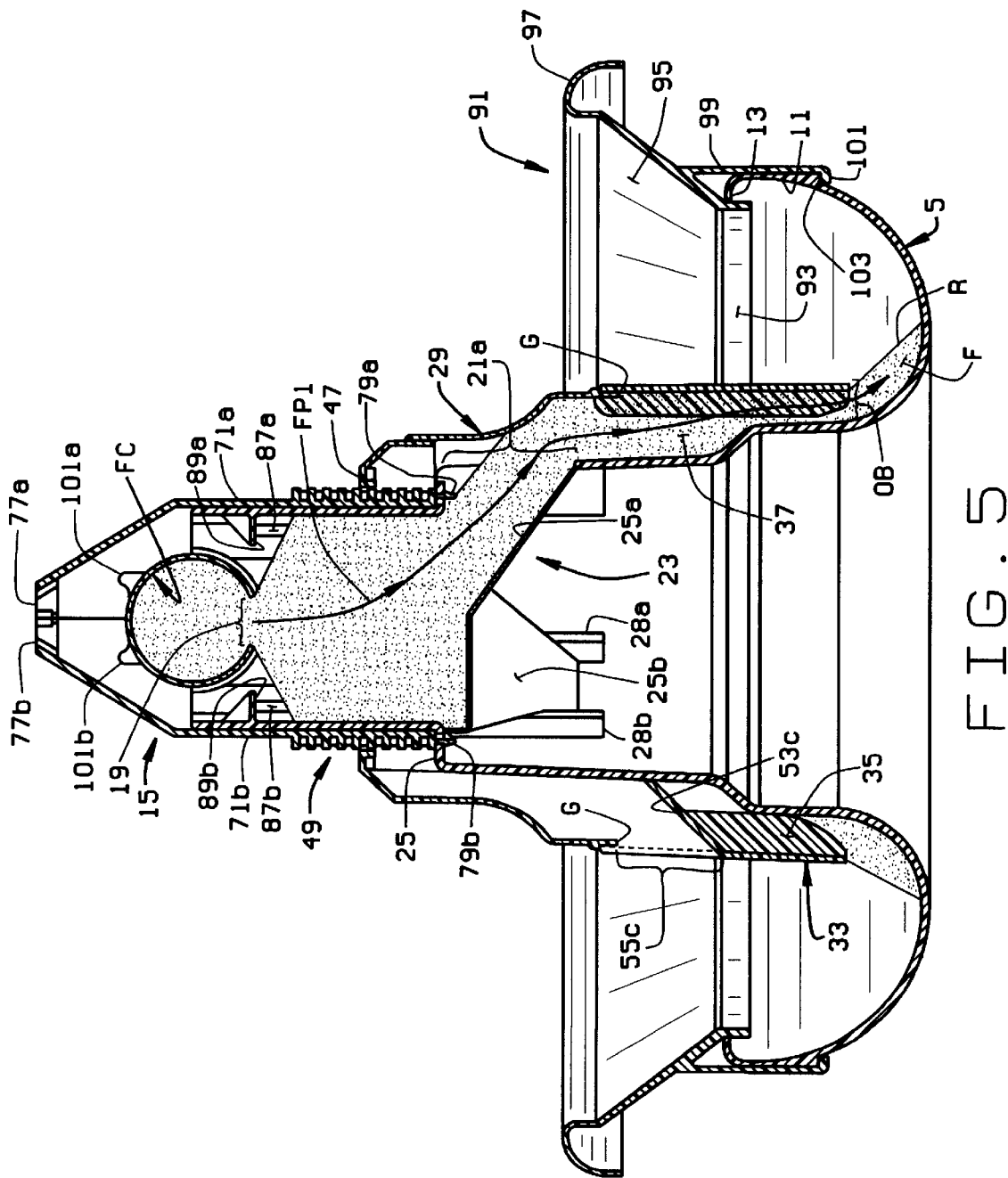
FIG. 5 is a cross sectional view of the feeder of this invention similar to FIG. 2, but further illustrating an extension ring snapped on to the feed pan so as to increase the depth of the feed pan and so as to permit larger birds (e.g., adult turkeys) to consume feed from the feed pan substantially without raking or billing feed out of the feed pan in such manner as to waste feed.

As indicated at 29, an upper cover surrounds the outside of main body tube 7 and is spaced radially outwardly therefrom so as to form a generally annular, vertically extending column, as indicated at 31, which forms the upper end of both a first feed flow path FP1 and of a second feed flow path FP2 for feed F as the feed is discharged from openings 21a–21c. These feed flow paths FP1 and FP2 will be described in detail hereinafter. A second or lower cover, as indicated at 33, surrounds the lower portion of main body tube 7 and is spaced radially therefrom by means of spacer ribs 35 so as to form an annular, vertically extending column, as indicated at 37 in FIG. 2, constituting a portion of the above-mentioned first feed flow path FP1. Column 37 receives feed from column 31 and which, if the lower cover 33 is in proper rotary position relative to main body tube 7, discharges feed F from the open bottom end OB of cover 33 (as shown in FIGS. 2 and 5) into the inner portion IP of feed pan 5 proximate the juncture between the inner portion of the feed pan and the bottom of main body tube 7, as shown in FIG. 1.

As shown in FIGS. 14 and 15, cover 29 is a one piece member having an upper cylindrical portion 39, a lower cylindrical portion 41, and a transition shoulder 43 therebetween. Radially inwardly directed tabs 45a–45c are provided at the upper end of cover 29 for engagement with the upper surface of cover 33, as shown in FIG. 1. Lower cover 33 has an upper shoulder 47 which, when the feeder 1 is assembled, surrounds the lower portion of connector 15 and which is coupled thereto by a threaded connection, as generally indicated at 49. This threaded connection will be described in detail hereinafter.

As best shown in FIG. 16, cover 33 further has six radial ribs 51 on the inside of cover 29 thereby to space cover 29 from the main body tube 7 and to insure that the annular space 31 between the main body tube 7 and the inner surface of cover 29 is of uniform thickness around the feeder. As indicated at 53a–53c, three inclined plates are molded into lower cover 33 between adjacent pairs of ribs 51. These inclined plates are equally angularly spaced around the lower cover at about 120° intervals so as to be in register with windows 21a–21c of main body tube 7 when the feeder is assembled and when the feeder is adjusted to be in its second feed dispensing position in which feed flowing out of openings 21a–21c of main body tube 7 is discharged onto inclined plates 53a–53c for directing the feed radially outwardly of cover 33 for discharge into feed pan 5 from openings 55a–55c which are spaced above the bottom of feed pan 7 for filling feed pan 5 with feed. In this manner, the feed pan will be filled with feed F to the height of the upper edge of windows 55a–55c above the feed pan, as controlled by the angle of repose R of the feed F discharged into the feed pan and by the height of the top of the windows 55a–55c above the feed pan. As will be more fully explained hereinafter, the height of windows 55a–55c relative to the feed pan is selectively adjustable so as to regulate or control the depth of the feed to be discharged into the feed pan.

As best shown in FIG. 16, lower cover 33 has three downwardly directed openings 57a–57c spaced equally angularly from one another at about a spacing of 120° alternating with inclined plates 55a–55c. These openings receive feed from openings 21a–21c in main body tube 7 and direct the feed downwardly within column 31.

In accordance with this invention, cover 33 may be rotated or indexed with respect to main body tube 7 one-half turn (i.e., about 180°) between a first operational position, as shown in FIG. 2, in which openings 57a–57c are aligned below the lower edges of respective windows 21a–21c in main body tube 7 such that feed flowing down inclined plates 25a–25c of diverter 23 will flow out of windows 21a–21c and flow downwardly through openings 57a–57c within the annular space 31 between the outer surface of main body tube 7 and the inner surface of the lower portion of cover 33 so as to be discharged from either the open bottom end OB of cover 33 into feed pan 5 adjacent the inner portion IP of the feed pan proximate main body tube 7 when feeder 1 is in its first feed flow path FP1, or downwardly through column 37 until encountering inclined plates 53a–53c for discharge through openings 55a–55c when feeder 1 is in its second feed flow path FP2.

Figure 3:
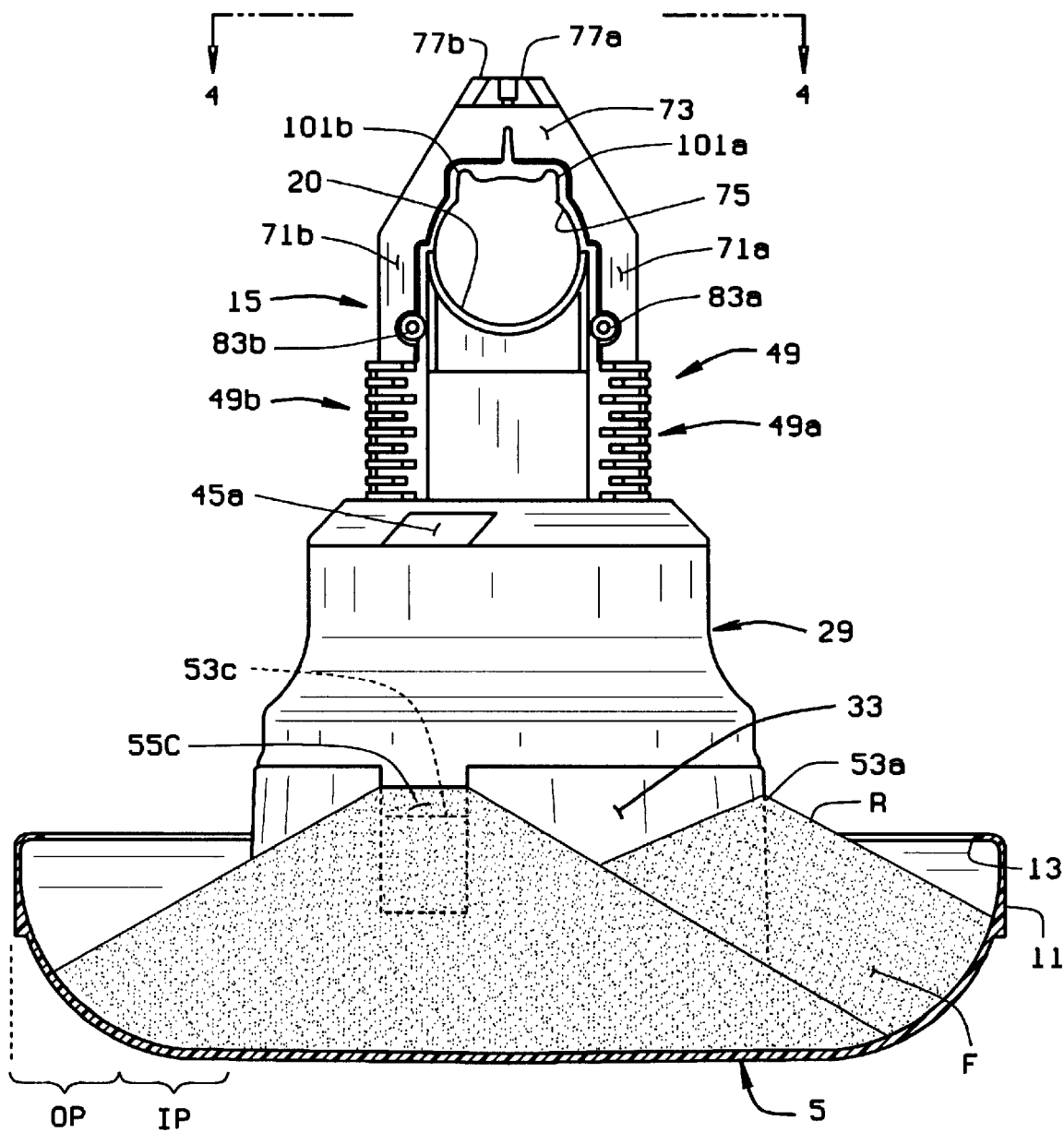
FIG. 3 is a view similar to FIG. 1 illustrating the feeder in a second position in which feed is discharged via a second feed flow path in which feed is discharged from the apertures in the main body of the feeder and from openings in the cover at an elevation above its open bottom so as to discharge a greater quantity of feed into the feed pan.

As noted, cover 33 may be indexed 180° relative to main body tube 7 such that openings 57a–57c move out of register with windows 21a–21c thereby to block the flow of feed through feed flow path FP1 and so as to move inclined plates 53a–53c into register with the lower reaches of windows 21a–21c such that feed flowing by gravity out of windows 21a–21c is directly downwardly and radially outwardly by the inclined plates for discharge from windows 55a–55c (as shown in FIGS. 3 and 4) into feed pan 5 at a height considerably above the bottom end of lower cover 33. In addition, the feed discharged from windows 55a–55c is deposited in both the outer portion OP and inner portion IP of feed pan 5, as shown in FIG. 3. This above-described feed flow path is referred to as a second feed flow path and is indicated by FP2, as shown in FIG. 4. Details of how cover 33 may be indexed relative to main body tube 7 will be described hereinafter. It will be noted that at all times, apertures 21a–21c are open and the feed flows from the main body tube 7 via these apertures or windows regardless of whether feed is dispensed from the first or the second feed flow path FP1 or FP2.

As shown in FIGS. 5 and 17, a circumferential groove G is provided in cover 33 at the upper ends of spacer ribs 35 for receiving the lower cylindrical margin of upper cover 29 in such manner as the upper and lower covers are removably snapped together. In this manner, both upper cover 29 and lower cover 33 may be rotated as a unit relative to main body tube 7 so as to change the flow of feed between feed flow path FP1 and feed flow path FP2 simply by rotating the covers on main body tube 7.

In accordance with the present invention, feeder 1 may selectively be adjusted to either of two (2) feed dispensing positions. First, feeder 1 may be adjusted in a first feed dispensing position, as shown in FIGS. 1, 2 and 5, in which feed is dispensed from main body tube 7 via feed flow path FP1 so as to be discharged from the open bottom end OB of lower cover 33 for depositing a relatively small quantity of feed F in the inner portion IP of feed pan 5 proximate the juncture of the lower portion of main body tube 7. The amount of feed deposited in the feed pan from this first feed flow path FP1 may be controlled by adjusting the height of bottom cover 33 relative to the inside surface of the feed pan. Specifically, the open bottom OB of lower cover 33 may be adjusted in vertical direction between a closed position, as shown in FIG. 4, in which the lower edge of the lower cover 33 cooperates with the transition between feed pan 5 and main body tube 7 so as to block the flow of feed from the bottom end of cover 33. When in this lowered, closed position, it will be noted that ring 47 on the upper end of cover 33 is in engagement with the lowermost thread of threaded adjustment 49. As shown in FIG. 2, the bottom end of lower cover 33 may be raised clear of the transition between feed pan 7 and main body tube 7 such that feed F flowing downwardly within feed flow path FP1 flows downwardly within the annular space or column 37 is discharged into inner portion IP of the feed pan via the open bottom OB of cover 33. It will be appreciated that the quantity of feed discharged into the feed pan via open bottom OB is controlled by the height that the lowermost edge of lower cover 33 is clear of the feed pan and the angle of repose R of feed F. It will be further appreciated that when the quantity of feed discharged into the feed pan 5 approximates the quantity of feed shown in the right-hand side of FIG. 2, the feed within the feed pan will block the further flow of feed into the feed pan. However, as birds consume feed from the feed pan, additional feed within the vertical column of feed 37 and from within main body tube 7 (which constitutes a feed reservoir) will continuously maintain the quantity of feed within the feed pan between operational cycles of feed conveyor FC. In this manner, when feeder 1 of the present invention is in its first feed position, the feeder presents only a minimal quantity of feed to the birds thus preventing undue spoilage and wasting of the feed in the feed pan, and yet this minimal quantity of feed is continuously replenished as long as feed is present within feed flow path FP1. It will also be noted that, regardless of whether the feeder is adjusted to dispense feed from its first feed flow path FP1 or from the second feed flow path FP2, feed is supplied in a first in, first out (FIFO) basis which aids in maintaining fresh feed being supplied by the feeder. In this manner, feed does not become trapped for extended periods of time, even if the flow of feed is switched between flow path FP1 and FP2.

In certain instances, particularly when introducing young birds in a poultry house, it may be desirable to flood feed pan 7 with feed (as shown in FIGS. 3 and 4). In order to flood feed pan 7 with feed, feeder 1 is adjusted so as to block the flow of feed to feed pan 5 via feed flow path FP1 and to allow the flow of feed into the feed pan via the above-noted feed flow path FP2 which discharges feed from windows 55a–55c at an elevation relative to the feed pan 5 substantially above the level of the feed pan. As shown in FIG. 2, when feed is discharged from windows 55a–55c, the feed will flow into the feed pan and fill it to a much greater depth than when feed is discharged from the bottom of the lower cover. The height of the feed discharged into the feed pan is dependent on the height of the upper edge of windows 55a–55c and the angle of repose R of feed F. By flooding feed pan 7 with feed, as shown in FIG. 4, young birds are better able to see the feed in the feed pan and thus will more readily begin to consume feed from the feeder.

In order to shift or adjust feeder 1 to discharge feed from feed flow path FP2 rather than from feed flow path FP1, it is necessary to rotate cover 33 one half turn (i.e., 180°) relative to main body tube 7. In this manner, openings 57a–57c in cover 33 are moved out of register with openings or windows 21a–21c in main body 1 and inclined plates 53a–53c are moved into register with these windows such that feed discharged via the openings 21a–21c is carried radially outwardly by inclined plates 53a–53c to openings 55a–55c in outer cover 33 thereby to allow the discharge of feed F from openings 55a–55c into feed pan 5 at an elevation substantially above the level of the feed pan, thus causing flooding of the feed pan with feed F, as above described.

As shown in FIG. 16, ring 47 on cover 33 has two indexing notches, as indicated at 59a, 59b, which receive corresponding shoulders 61a, 61b (see FIGS. 9–11) on connector 15 so as to positively locate cover 33 relative to the connector and the main body tube 7 in either a first position in which openings 57a–57c are aligned below windows 21a–21c in main body tube 7 so as to receive feed from windows 21a–21c and to direct feed F downwardly within feed column 31 for discharge from the open bottom end of cover 33, as shown in FIG. 2. With cover 33 rotated 180° to its second position, inclined plates 53a–53c are aligned in register with windows 21a–21c so as to block the flow of feed downwardly into feed column 31 and to direct the flow of feed radially outwardly through windows or openings 55a–55c in cover 33 for depositing feed in feed pan 5, as shown in FIG. 4.

Figure 10:
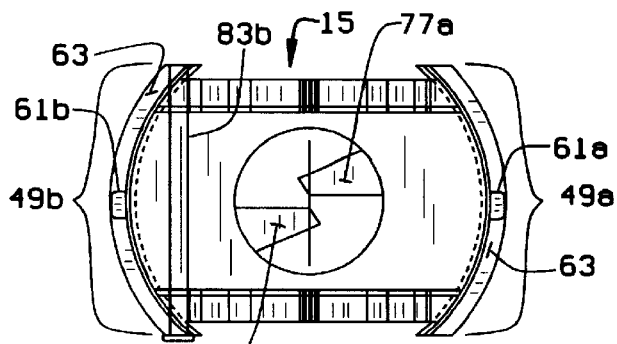
FIG. 10 is a top plan view of the connector shown in FIG. 9.
Figure 9:
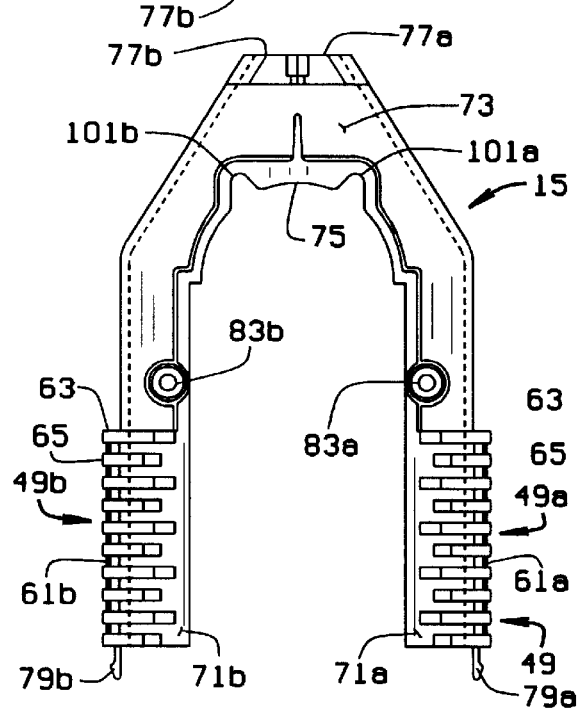
FIG. 9 is a front elevational view of a connector for connecting the feeder of the present invention to a feed conveyor tube so as to allow the feeder to receive feed from the feed conveyor tube and to discharge such feed into the feeder.
Figure 11:
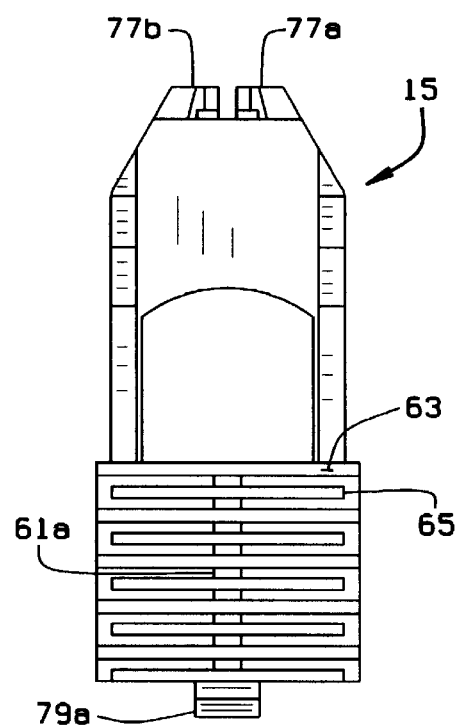
FIG. 11 is a right side elevational view of the connector shown in FIG. 9.

As noted above, cover 33 is vertically adjustable relative to main body tube 7 by means of threaded connection 49. As shown in FIGS. 9–11, connector 15 has a series of alternating spaced threads including a longer thread 63 and a shorter thread 65. As shown in FIG. 10, these threads are provided on the outer, generally part-circular surfaces of connector 15 and thus there are two sets of threads 49a, 49b spaced apart on diametrically opposed sides of the connector. More specifically, thread sets 49a, 49b are not in true sense threads in that the threads 63 and 65 are parallel to the longitudinal axis of the main body tube 7 and thus actually constitute a means for adjusting the vertical position of cover 33 relative to main body tube 7 in any one of a plurality of fixed adjusted position, depending on the number of threads 63, 65 and the spacing of the threads. Further, threaded connection 49 includes two opposed, inwardly projecting flanges 67a, 67b adapted to be received between the grooves formed by threads 63, 65 of thread sets 49a, 49b, respectively.

To adjust cover 33 in heightwise relation to main body tube 7, cover 33 is rotated relative to the main body such that thread flanges 67a, 67b are rotated clear of thread sets 49a, 49b and then the cover is moved in up or down relative to main body tube 7 to a desired position, and then the cover is rotated so as to engage shoulder 67a, 67b into reception between threads 63, 65 at the desired new adjusted position. With threads 49a, 49b properly receiving thread shoulders 67a, 67b, vertical shoulder 61a, 61b are received in grooves 59a, 59b thereby to lock cover in its desired heightwise position relative to main body tube 7. As noted, by changing the height of cover 33 relative to feed pan 5, the amount of feed discharged into the feed pan from either the first or second feed flow path FP1 or FP2 may be charged.

To adjust feeder 1 so as to change the flow of feed from feed flow path FP2 to feed flow path FP1, cover 33 (as shown in FIG. 16) is rotated relative to main body tube 7 (connector 15) so that cover 33 is rotated one half turn (180°) relative to main body tube 7 thus changing the register between inclined plates 53a–53c and openings 57a–57c with windows 21a–21c in the manner above described. It will be noted that in order to both change the discharge of feed from either the first of the second feed flow paths FP1 or FP2 and to adjust the quantity of feed dispensed in both of these conditions, it is only necessary to move a single component, cover 33.

Referring to FIGS. 9–10, connector 15 is shown to be a one piece part having a pair of spaced legs 71a, 71b on which thread sets 49a, 49b are formed with an upper yoke 73 therebetween. Connector 15 further has a part circular opening 75 for receiving feed conveyor tube 17. Fingers 77a, 77b are provided on the upper surface of yoke 73 for holding an electric shock wire (not shown) so as to prevent birds in the poultry house from perching on the feeders or on the feed conveyor tube between the feeders. As indicated at 79a, 79b, spring locking tabs are provided on the lower ends of legs 71a, 71b. These locking tabs are inserted in corresponding openings 81a, 81b in shoulder 25 of main body tube 7, as shown best in FIG. 6, so as to snap lock connector 15 onto the main body tube. In addition to tabs 79a, 79b, connector 15 is further held in place (locked) to main body tube 7 by means of headed fastening pins 83a, 83b (see FIGS. 1, 3, and 10) which are inserted into pin receiving openings 85a, 85b in connector legs 71a, 71b and through openings 87a, 87b in main body 7 (as best shown in FIGS. 5 and 7) below overhanging shoulders 89a, 89b formed within main body 7 so as to positively retain connector 15 on the upper end of main body tube 7 and to enable the connection to withstand the weight of the feeder and the forces that may be imparted to the feeder as it is suspended on feed conveyor tube 17 during normal operation in a turkey house or the like. Yet, the connector may be readily removed from the main body 3 of feeder 1 by removing pins 83a, 83b and pulling on connector 15 so as to withdraw tabs 79a, 79b from slots 81a, 81b.

Figure 18:
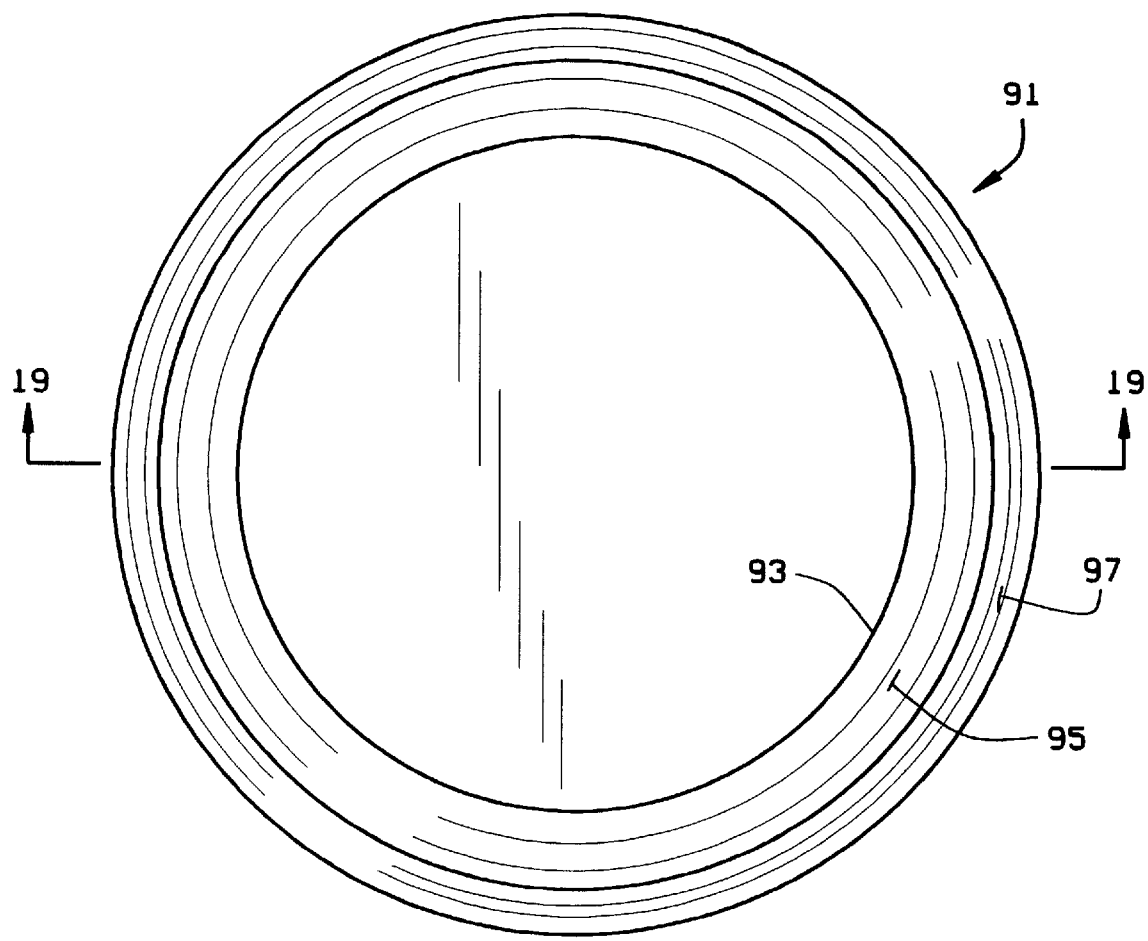
FIG. 18 is a top plan view of the extension ring shown in FIG. 5 which may be selectively snapped in place of the feed pan or removed therefrom.
Figure 19:
FIG. 19 is a cross sectional view of the extension ring taken along line 19—19 of FIG. 18 illustrating a flexible bumper integrally formed on the outer portion of the ring so as to protect the birds against impact injury caused by bumping into the feeder.

As shown in FIGS. 5, 18 and 19, an optional feed pan ring 91 may be selectively added to feed pan 5 (or removed therefrom) so as to increase both the diameter and the depth of the feed pan so as to contain an additional quantity of feed F and so as to prevent the birds, particularly larger birds, such as adult turkeys or the like, from billing or raking feed from feed pan 5 onto the floor of the poultry house where such feed will be wasted. More specifically, ring 91 comprises a flange 93 adapted to be positioned on the inside of rim flange 13 of feed pan 5, a side 95 sloping upwardly and outwardly from flange 93, and a down turned flange 97 at the upper end of the ring. On the back side of side 95, a vertical flange 99 extends downwardly on the outside of the upper edge of rim 11 of the feed pan and a lower, inwardly extending finger 101 engages a detent 103 on feed pan rim 11 so as to snap lock ring 91 on feed pan 5.

Preferably, ring 91 is molded of a suitable thermoplastic, such as linear low density polyethylene, and the downwardly turned flange 97 is thus of flexible and resilient construction so as to serve as a bumper such that if an adult turkey or other bird bumps into flange 97, the flange will resiliently deform thus absorbing a good deal of the energy of the bird hitting flange 97 thus lessening the chances of the bird being injured by bumping into the flange. It will be understood that in turkey houses, the birds may become excited and some birds are injured by the feeders. As shown in FIG. 19, flange 97 is shown to be integrally molded with other parts of the ring 91, but is thinner than other parts of the ring so that it will flex if bumped by a bird. However, it will be appreciated that flange 97 could be fabricated from a material different from the body of ring 91 so as to be of a softer more resilient material. It will also be appreciated that such flexible bumper flanges can be provided on feeder feed pans without the addition of a separate ring, such as ring 91. For example, such a flexible bumper may be molded integrally with the lower portion 95 of ring 91. It will be appreciated that ring 91 is shown to be of integral construction such that there must be relative deformation of the ring and/or of the feed pan 5 so as to enable installation and/or removal of the ring 91 onto or from feed pan 5. With the ring and the feed pan molded on a suitable plastic resin (as hereinafter described), such deformation may readily be accommodated without permanently deforming the ring or the feed pan.

Figure 20:
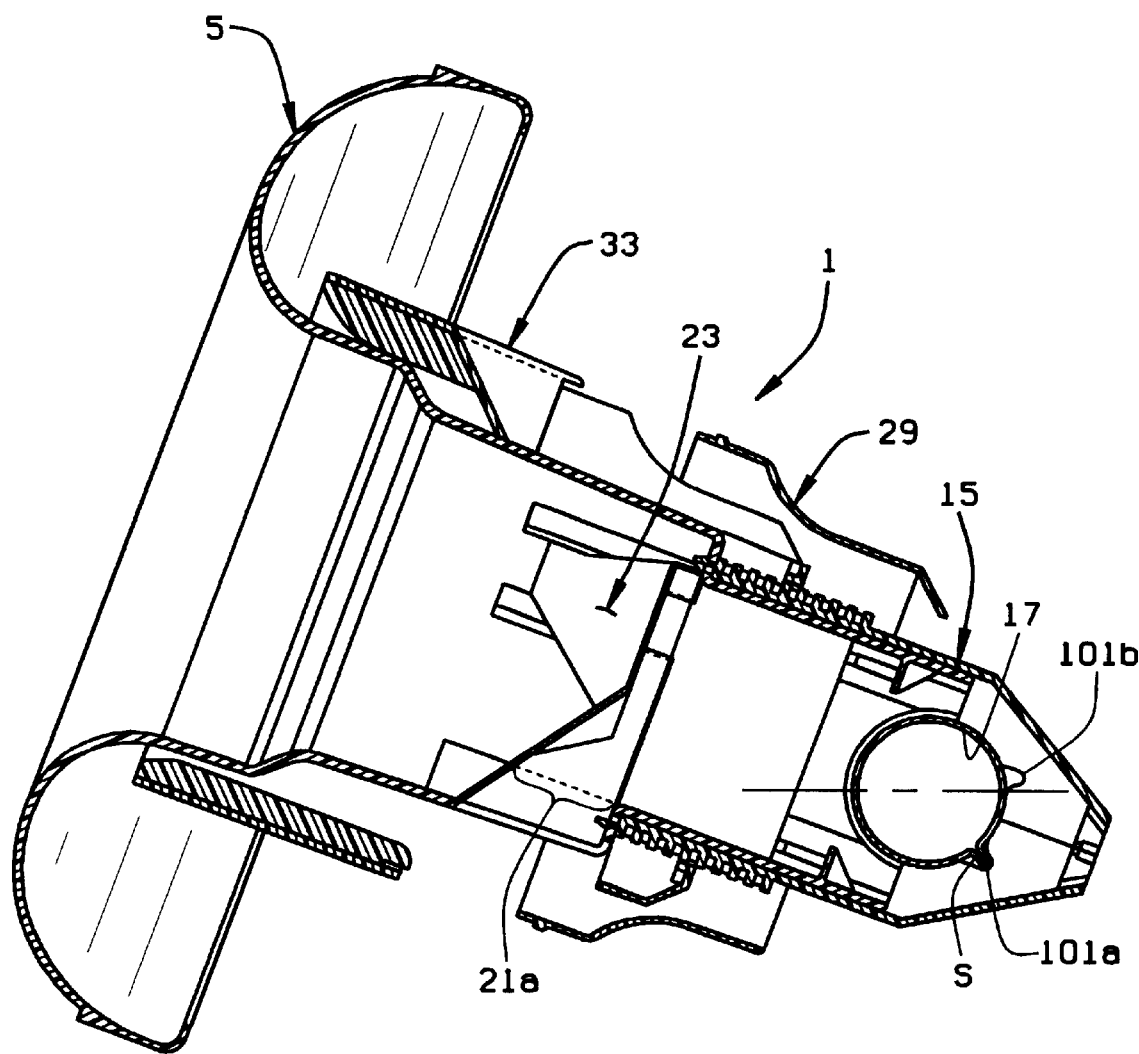
FIG. 20 is a side elevational view of the feeder shown in a clean out position in which the feeder is rotated about 110° in clockwise direction on the feed conveyor tube and in which it is held in this inclined position by a raised seam on the conveyor tube cooperating with a notch in the feeder so as to allow an attendant to clean out the feeder with a high pressure spray hose or the like as the poultry house is readied for the next flock of birds.
Figure 21:
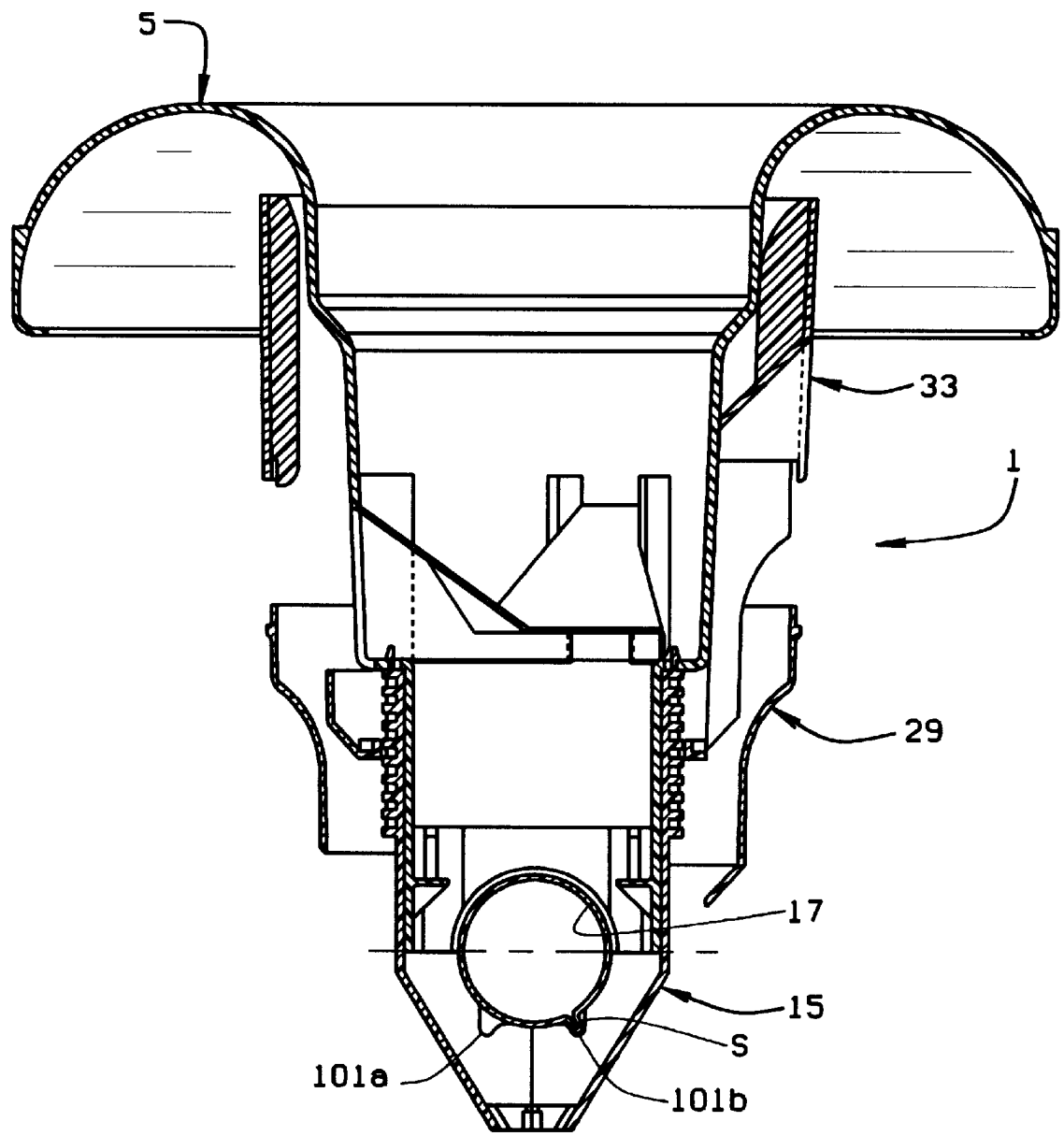
FIG. 21 is a view of the feeder rotated to an inverted position on the feed conveyor tube so as to allow water to better drain from the feed after cleaning.

Referring now to FIGS. 20 and 21, feeder 1 of the present invention may be rotated relative to feed conveyor tube 17 to a partially inverted position (as shown in FIG. 20) in which the feeder may be washed out with a high pressure spray hose or the like while the poultry house is being cleaned between flocks of birds raised in the house. As is conventional, feed conveyor tube 17 has a longitudinal seam S formed thereon and running lengthwise of the tube. Typically, seam S is cut away from tube 17 at the locations of feeders 1 along the tube generally in register with openings 19 in the bottom of the tube so that the feeder is free to rotate about the feed conveyor tube 17. As shown in FIG. 20, seam S is generally oriented to at to be at about the 4:30 o'clock position. Connector 15 of feeder 1 is provided with a pair of spaced notches 101a, 101b in the upper portion of the connector when feeder 1 is in its normal upright feeding position. Specifically, opening 101a, 101b are provided in the part-circular opening 75 of the connector for receiving seam S.

More specifically, in order to rotate feeder 1 on feed conveyor tube 17, with the feeder positioned along the feed conveyor tube in a region in which seam S is removed and with opening 19 in the feed conveyor tube in register with the upper reach of the feeder, the feeder is rotated relative to feed conveyor tube 17 from its normal operating position (as shown in FIG. 1) to the partially inverted cleaning position shown in FIG. 20. The feeder is then moved in one axial direction or the other along the feed conveyor tube 17 such that the seam S enters notch 101a. In this manner, seam S cooperates with notch 101a in connector 15 so as to hold the feeder in the inclined, partially inverted position shown in FIG. 20 during the cleaning operation. It will be noted that upper cover 29 may be moved toward the feed conveyor tube 17 relative to the lower cover 33 so as to open the internal passages of the feeder thereby to better enable clean out of the feeder. Once the feeder has been power washed with a spray or the like, the feeder may be further rotated on the feed conveyor tube to the fully inverted position, as shown in FIG. 21, in which seam S is received in notch 101b. In order to rotate the feeder from its inclined position, as shown in FIG. 20, to its fully inverted position, as shown in FIG. 21, it is necessary to slide the feeder axially along feed conveyor tube 17 so that seam S is out of register with notch 101a, so that the feeder can be fully rotated to its fully inverted position, and so that seam S may be received in notch 101b. The feeder is then slid in axial direction along feed conveyor tube 17 such that seam S enters notch 101b and thus hold the feeder in its fully inverted position. In this fully inverted position, water will better drain from the feeder and the formation on pools of water within the feeder are lessened.

Also, with the feeders 1 in the inverted positions of FIGS. 20 or 21 and with the feed conveyor tube raised toward the roof of the poultry house by means of a winch and cable arrangement (not shown) which is widely used in the poultry industry so as to support the feed conveyor tube 17 and the feeders located thereon, additional clearance is provided under the feeders to make cleaning of the poultry house easier. Of course, when the feeder is washed and allowed to properly dry, the feeder may be again moved axially on the feed conveyor tube and rotated so that the feeder is positioned below opening 19 so as to receive feed from the feed conveyor tube upon operation of the feed conveyor.

Figure 22:
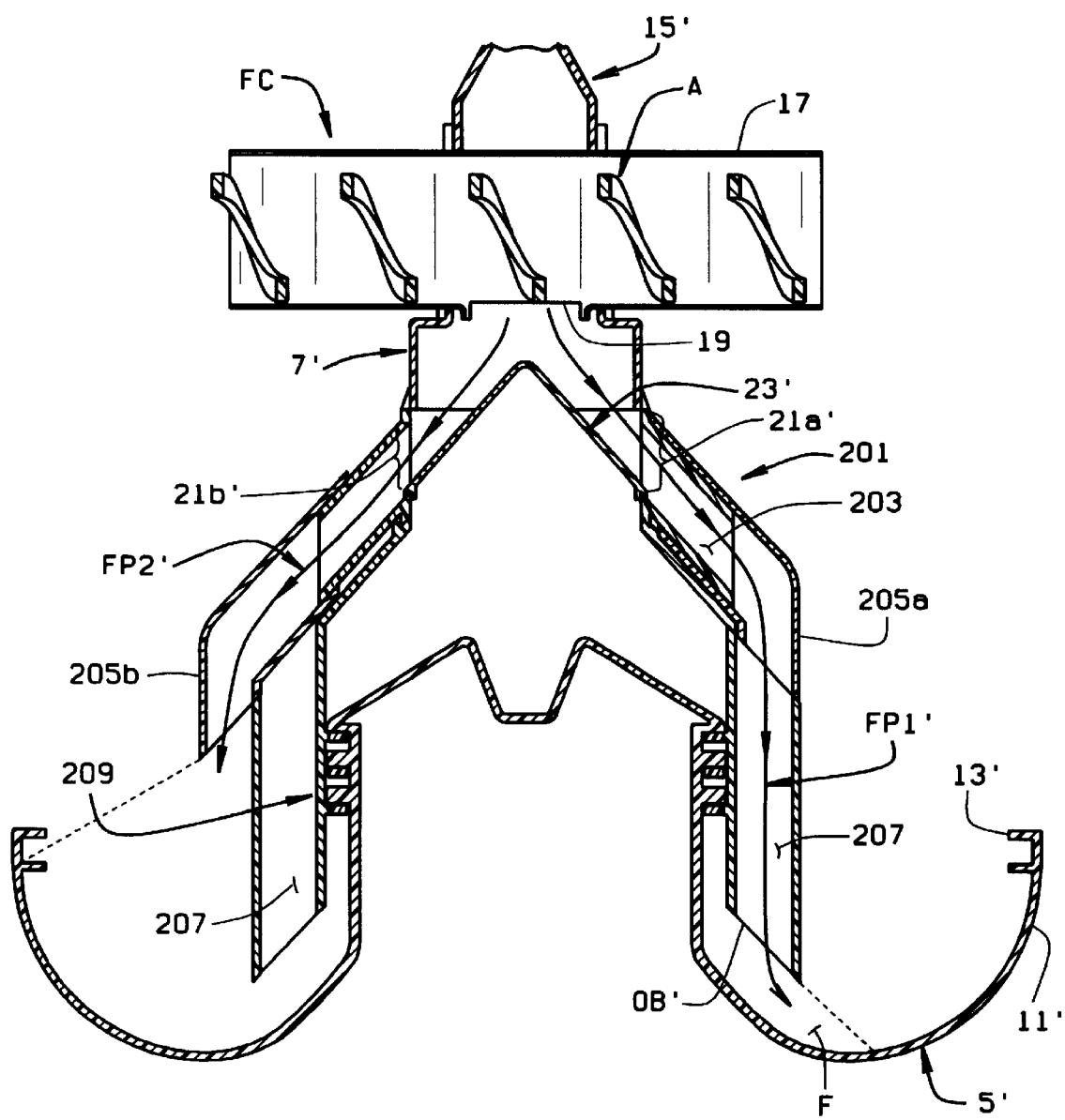
FIG. 22 is a vertical cross sectional view of another embodiment of the feeder of the present invention which has upper spouts which may be selectively moved radially inwardly and outwardly so as to direct feed flowing from the apertures in the main body of the feeder to either a first feed flow path (as shown on the right-hand side of the feeder) in which feed is discharged from the open bottom of a cover surrounding the main body for discharge into the feed pan at a location proximate the main body or to a second feed flow path (as shown on the left-hand side of the feeder) in which the upper spouts are radially extended so as to discharge feed therefrom radially outwardly within the feed pan from an elevation above the discharge for the first feed flow path thereby to increase the quantity of feed discharged into the feed pan so as to flood the feed pan with feed.

Referring now to FIG. 22, an alternate embodiment of the feeder of the present invention is shown to be indicated at 201. It will be appreciated that feeder 201 has two flow paths FP1' (as shown on the right-hand side of FIG. 22) analogous to flow path FP1 of feeder 1 and another feed flow path FP2' (as shown on the left-had side of FIG. 22) analogous to feed flow path FP2 of feeder 1. Because there is a substantial similarity between feeders 1 heretofore described and feeder 201, the "primed" reference characters in FIG. 22 indicated parts having a corresponding function with similar part of feeder 1 and thus will not be described separately. Feed discharged from feed flow path FP1' is shown to be discharged into feed pan 5' proximate the inner portion of the feed pan. However, feed discharged from the outlet of feed flow path FP2' is discharged radially outwardly more toward rim 11' of feed pan 5' and at an elevation considerably above the outlet of feed flow path FP1' so as to deposit and greater quantity of feed in feed pan 5'. As shown, the feed discharged out of the second feed flow path FP2' floods feed pan 5' with feed.

In operation, in order to change feeder 201 between its above-described first feed dispensing path FP1' and its second feed flow path FP2', it is only necessary that spouts 205a–205c be extended or retracted. It will be appreciated that unlike feeder 1 of this invention, it is not necessary to rotate a portion of feeder 201 relative to main body tube 7' so as to change between the two feed flow paths. It will be also appreciated that with feeder 201, some of the spouts 205a–205c may be in their retracted positions while one or more of the spouts may be in their extended positions such that feed may be simultaneously dispensed from both feed flow paths FP1' and FP2' into feed pan 5'. This may be desired in some poultry raising conditions.

As noted, feed F from opening 19 in feed conveyor tube 17 is discharged into feeder 201 in the same manner as heretofore described in regard to feeder 1. That is, as the feed flows downwardly within the main body 7' of feeder 201, it encounters a diverter plate 23' and is directly radially outwardly toward openings 21a'–21c' in main body tube 7. With feeder 201 in its first feed dispensing position (as shown in the right-hand side of FIG. 22), feed from openings 21a–21c is discharged into a respective inclined passageways 203a–203c. With feeder 201 adjusted to discharge feed from its first feed flow path FP1', feed from inclined passageways 203a–203c is discharged into a respective movable spout 205a–205c. As shown in the right-hand portion of FIG. 22, with spouts 205a–205c adjusted so as to be in their radially inwardly retracted position, feed is discharged therefrom into a vertical column 207 which in turn discharges feed F by gravity into the inner reaches of feed pan 5' proximate the juncture between the feed pan and the main body 7'. As shown in the right-hand side of FIG. 22, the feed is discharged from the open bottom OB' of the discharge column 207 and the height that the bottom edge of column 207 is above feed pan 5' controls the amount of feed F discharged into feed pan 5'. It will be understood that the vertical height of the open bottom OB' of column 207 may be selectively adjusted by moving feed pan 5' up or down relative to main body tube 7' by means of a threaded adjustment, as indicated at 209, adjustably linking feed pan 5' to main body tube 7. By varying threaded connector 209, the vertical distance between the lower ends of columns 207 and feed pan 7' or the vertical distance between the ends of spouts 205a–205c may be adjusted thus enabling the quantity of the feed in feed pan 5' to be selectively varied.

In accordance with this invention, discharge of feed from feed path FP1' to the discharge of feed from the second feed flow path FP2' may be selectively changed by moving spouts 205a–205c (there being one spout for each opening 21a'–21c') radially inwardly and outward between the radially inward position of spout 205a (as shown in the right-hand side of FIG. 22) and the radially outward position of spout 205b (as shown in the left-hand side of FIG. 22). In this manner, with the spouts in their radially inward position, feed may be dispensed from spouts 205a–205c into pan 5' via feed flow path FP1' in such manner that a relatively small quantity of feed F is discharged into the inner portion of feed pan 5' proximate main body 7'. Upon shifting the position of spouts 205a–205c to their radially extended position (as shown on the left-hand portion of FIG. 22), feed F will be dispensed from the now more outwardly extended spouts into feed pan 5' along feed flow path FP2' into feed pan 5' at a position radially outwardly toward rim 11' of feed pan 5'. In addition, feed dispensed from the outwardly extended spouts 205a–205c is discharged from a higher elevation such that more feed can be dispensed into feed pan 5' thereby to flood the feed pan with feed, if desired.

As shown in FIG. 22, under some circumstances, it may be desirable to discharge substantially more feed into one side of feed pan 5' than the other. This may be accomplished by extending one or more of the spouts 205a–205c while retracting others of the spouts.

In comparing feeders 1 and 201, it will be noted that by moving only one member (i.e., cover 33 in feeder 1 or spouts 205a–207c in feeder 201), the flow of feed to either the first feed flow path FP1 (or FP1') or to the second feed flow path FP2 (or FP2') may be controlled.

As noted above, feed pan 5' is shown to be a separate component from main body tube 7' (i.e., the feed pan 5' and the main body tube 7' are not integrally molded as one piece). It will be understood that a similar separate feed pan 5 and main body tube 7 could, within the broader aspects of this invention, be utilized in conjunction with feeder 1 (i.e., the feed pan and the main body tube need not be integral). By providing a separate feed pan 5 and main body tube 7 and by adjustably interconnecting the feed pan and the main body tube by means of a threaded connection similar to that indicated at 209 and shown in FIG. 22, feeder 1 may thus be provided with an additional manner of adjusting the amount of feed discharged into feed pan 5 whether the feed is discharged via feed flow path FP1 or feed flow path FP2.

Figure 23:
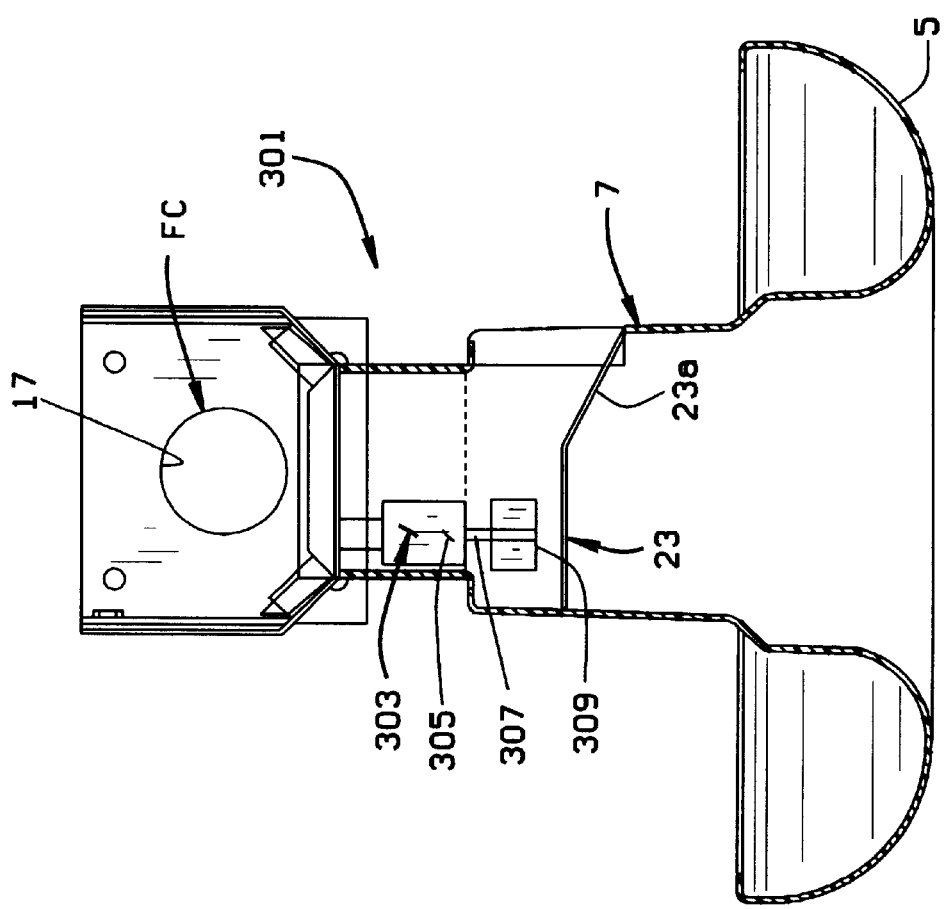
FIG. 23 is a vertical cross sectional view of a control feeder of the present invention having a sensor for sensing the level of feed discharged from the feed conveyor into the main body of the feeder and for controlling operation of the feed conveyor in response to this sensing calling for the delivery or shutting of feed to the feeders.

As shown in FIG. 23, a feeder of the present invention (as shown in FIGS. 1–21) may be modified to as to serve as a control unit, as generally indicated at 301, for controlling operation of feed conveyor FC so as to allow operation of the feed conveyor so as to fill all of the feeders 1 along the feed conveyor with feed and to then shut off the feed conveyor when all of the feeders have been filled. More specifically, control unit 301 is preferably positioned at the end of a run of feeders 1 located along of a feed conveyor if the auger is rotably driven so as to act as a screw conveyor. However, if the feed conveyor FC is arranged in and endless loop with the auger A being axially propelled around the endless loop of feed conveyor tube 17, the control unit 301 is preferably placed immediately before a feed hopper which supplies feed to the feed conveyor. By so positioning the control unit along the feed conveyor, the feed control unit is the last (or nearly the last) feeder to be completely filled with feed. A sensor, as generally indicated at 303, may be positioned within control unit 301. This sensor is responsive to the quantity of feed within control unit 301 such that upon the control unit receiving a desired amount of feed, the sensor will generate a signal indicating that the control unit is substantially filled with feed. This control signal is then used to stop operation of the feed conveyor FC. It will be appreciated that upon another signal being generated for starting operation of the feed conveyor (such other signal may, for example, be a timer or the same or another sensor 303 located within the control unit sensing that the feed within the feeder has dropped below a predetermined level), the feed conveyor will again resume operation so as to convey fresh feed along feed conveyor FC and to refill each of the feeders 1 along the feed conveyor. It will be further appreciated that as each feeder 1 becomes filled with feed, no more feed will enter the feeder from feed conveyor FC and feed conveyed through the feed conveyor will be conveyed past the filled feeders to feeders that are not yet filled with feed. As the control unit 301 at the end of the feed conveyor becomes filled with feed and as the sensor 303 generates the above-said signal which is used to stop operation of the feed conveyor, it is assured that all feeders along the feed conveyor are fully charged with feed. Moreover, when the feed conveyor is so stopped, it will be appreciated that the conveyor tube 17 between each feeder 1 will be charged with feed as well so that upon start-up of the feed conveyor, these charges of feed within the conveyor conduit are immediately dumped into the next adjacent feeder downstream so that an instantaneous charge of feed is substantially simultaneously delivered to each feeder 1 upon start-up of the feed conveyor so that the birds are not drawn to only a few of the feeders initially receiving feed. This has been found to lessen the chance of the birds being injured.

Sensor 303 is preferably a small electric motor 305 having a rotary output shaft 307 which in turn carries a paddle 309 or the like. Motor 305 is selectively positioned within control unit 301 such that paddle is engageable with feed F when the feed substantially fills the internal volume of main body tube 7 of the control unit such that the presence of feed will stop the paddle and the output shaft of motor 305 from rotating. Upon stoppage of motor 305, an electrical signal is generated indicative of the presence of feed within the control unit and thus indicating that operation of the feed conveyor may be terminated. The details of this sensor 303 is described in detail in the co-assigned U.S. patent application Ser. No. 08/538,910 filed Oct. 4, 1995 and invented by Thomas J. Cull. This last-noted patent application is incorporated herein by reference.

Alternately, sensor 303 may be a paddle operated limit switch (not shown) which is actuable by the presence of feed F substantially filling the main body tube 7 of the control unit 301. Such a paddle switch control is described in the co-assigned U.S. Pat. No. 5,462,017 which is also herein incorporated by reference. As another alternative, the sensor 303 may be a proximity switch.

It is preferred that all of the major components of feeder 1 be molded of a suitable plastic resin, such as impact polypropylene copolymer resin SB912 available from Motell. The connector 15 is preferably molded of Nylon 66 commercially available from E. I DuPont de Nemours and Co., of Wilmington, Del. The choice of what particular resin to use may be influenced by the cost of resin, requirements of the tooling or molds, and the injection molding machine used to mold the feeder. However, within the broader scope of this invention, feeder 1 may be molded of any suitable resin and need not be molded of plastic, but could be formed of any material, such as metal or whatever is preferred.

Figure 24:
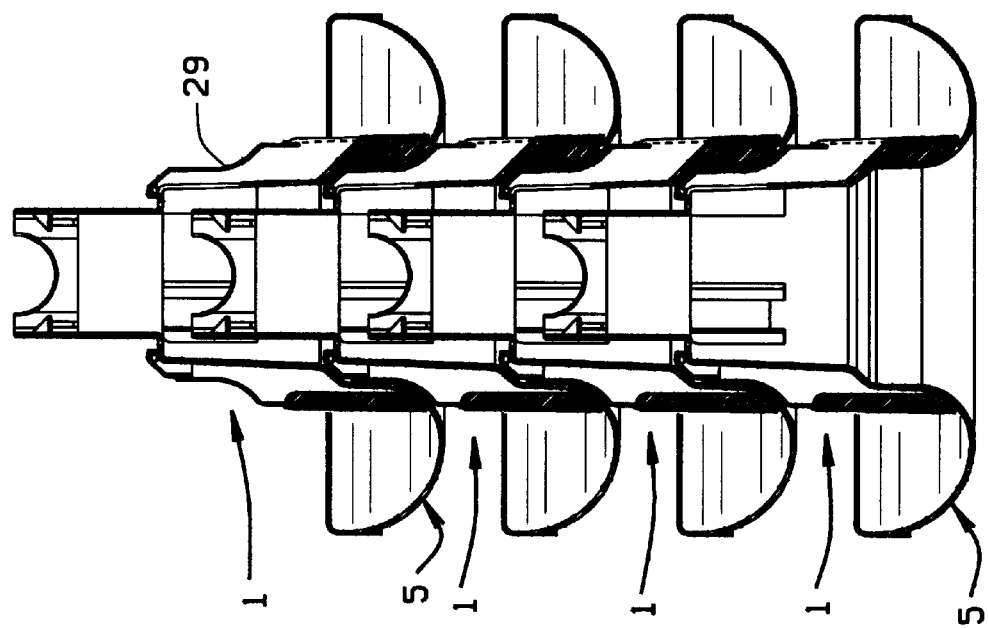
FIG. 24 is a view showing multiple feeders of the present invention (with certain parts removed) in a stacked or nested position to allow for compact and efficient shipping of the feeders.

Referring to FIG. 24, it is shown that a plurality of feeders 1 may be partially disassembled by removing connectors 15 from the upper end of main body tube 7 and by inserting the upper portion of the main body tube 7 of a lower feeder 1 into the open bottom of an upper feeder. It will be noted that the inner surface of the open bottom of the feeders is configured to mate with the outer surface of upper cover 29 so as to better facilitate nesting. By so nesting feeders 1 during slipping, considerably more feeders may be in a container of a given size. This is particularly important upon exporting feeder as shown, for (4) feeders 1 of this invention may be nested, such that the nested stack has a height of approximately 25 inches (100 cm.). It will be appreciated that this is an important advantage when a single feeder 1 has a height of about 15 inches.

Referring now to FIG. 25, a modification of feeder 1 is shown in which feed pan 5 has been modified so as to have a resilient bumper flange 97' molded integrally with the upper portion of the pan rim thereby to lessen injury to birds impacting the feed pan. This bumper flange 97' is similar in construction to flange 97 described above in regard to ring 91.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

1. A feeder having a generally vertically extending main body for receiving feed, a feed pan carried by said main body for receiving said feed therein and for allowing poultry to consume said feed from said feed pan, at least one opening in said main body intermediate its top and bottom through which all of said feed received by said main body is discharged for delivery to said feed pan by either a first feed flow path or by a second feed flow path, a cover being spaced axially outwardly of said main body defining a vertically extending annular space between said cover and said main body, said cover having an open bottom and one or more openings therein intermediate the level of said at least one opening in said main body and said open bottom of said cover, said cover being rotatable relative to said main body between a first position in which feed from said at least one opening in said main body is discharged into said first feed flow path for the gravity flow of said feed downwardly within said annular space between said main body and said cover for discharge from said open bottom of said cover into said feed pan, and a second position in which feed discharged from said at least one opening in said main body is discharged into said second feed flow path for the gravity discharge of feed via said at least one opening in said cover into said feed pan thereby to enable filling of said feed pan with feed to a greater extent than when feed is discharged from said first feed flow path.

2. A feeder as set forth in claim 1 wherein said cover is vertically adjustable relative to said main body thereby to regulate the amount of feed discharged from said open bottom of said cover into said feed pan.

3. A feeder as set forth in claim 1 wherein said cover may be fixed at different vertical positions relative to said main body and relative to said feed pan thereby to regulate the amount of feed discharged into said feed pan.

4. A feeder as set forth in claim 1 wherein said feed pan is integral with said main body.

5. A feeder as set forth in claim 1 further comprising a diverter within said main body for directing the gravity flow of feed from within said main body to said at least one opening in said main body.

6. A feeder having a drop tube operably connectable to a feed conveyor for delivering feed to said feeder, a feed pan carried by said drop tube for receiving feed from said drop tube and for presenting said feed within said feed pan for consumption by poultry, at least one aperture in said drop tube above the level of said feed pan through which all of the feed dispensed from said feed conveyor flows by gravity from said drop tube into said feed pan, said feed pan having an inner portion and an outer portion disposed radially outwardly from said inner portion, a first feed path for directing feed discharged from said at least one aperture in said drop tube into said inner portion of said feed pan and a second feed path for directing feed discharged from said at least one aperture into said outer portion of said feed pan, and a selectively movable cover member positioned on the outside of said drop tube proximate said at least one aperture for selectively controlling the flow of feed from said at least one aperture to said first feed flow path or said second flow path, said cover member having an open bottom, wherein said first feed path includes an annular space between said cover member and said drop tube below the level of said at least one aperture through which feed discharged from said at least one aperture is gravity discharged for delivery into said feed pan via the open bottom of said cover member proximate the inner portion of said feed pan.

7. A feeder as set forth in claim 6 wherein said second feed flow path includes at least one opening in said cover member adapted to receive feed flowing by gravity from said at least one aperture in said drop tube such that feed is discharged by gravity from said at least one opening for delivery of said feed into said feed pan from a height above said open bottom of said cover member.

8. A feeder as set forth in claim 6 wherein said cover member is rotatable relative to said drop tube from a first rotary position in which said first feed flow path delivers feed from said drop tube into said feed pan and a second rotary position in which said second feed flow path delivers feed into said feed pan.

9. A feeder as set forth in claim 8 in which said cover member may be adjusted in vertical direction relative to said feed pan so as to regulate the amount of feed discharged into said feed pan via said first feed flow path.

10. A feeder as set forth in claim 8 wherein said cover member may be adjusted in vertical direction relative to said feed pan so as to regulate the amount of feed discharged into said feed pan via said second feed flow path.

11. A feeder as set forth in claim 6 having a diverter within said drop tube for diverting feed flowing downwardly within said drop tube outwardly to said at least one aperture in said drop tube.

12. A feeder as set forth in claim 6 wherein said member is selectively movable from an inner position in which it receives feed from said at least one aperture and directs said feed for the gravity flow of feed into said feed pan via said first feed flow path to an outer position in which it receives feed from said at least one aperture and directs said feed for the gravity flow of feed into said feed pan via said second feed flow path.

13. A feeder as set forth in claim 12 wherein said member comprises at least one spout selectively movable between said inner position and said outer position.

14. A feeder having a drop tube for receiving feed from a source of feed, a feed pan receiving feed for consumption by poultry, said feed pan having a rim, an outer portion, and an inner portion, said drop tube having at least one aperture therein spaced above said feed pan through which all of the feed from said drop tube is discharged for delivery to said feed pan, a first feed path having an inlet for receiving feed discharged from said at least one aperture and an outlet for discharging feed into said inner portion of said feed pan and a second feed path having an inlet for receiving feed discharged from said at least one aperture and an outlet for discharging feed into said outer portion of said feed pan, said second feed path outlet being disposed above the level of said first feed path outlet thereby to permit filling of said feed pan to a greater extent than when feed is discharged from said first feed path outlet, and a cover for selectively controlling the flow of feed from either said first feed flow path or from said second feed flow path, said cover at least in part surrounding said drop tube and being spaced radially outwardly therefrom for forming a generally annular space between said drop tube and said cover, said cover having an open bottom and at least one discharge opening therein above its bottom end, said generally annular space constituting a portion of said first flow path, said cover being rotatable mounted with respect to said drop tube for rotation between a first position in which said cover receives feed from said at least one aperture and dispenses said feed downwardly along said first feed path for discharging said feed into said inner portion of said feed pan from said open bottom of said cover with said open bottom of said cover constituting said first outlet of said first feed flow path, and a second position in which feed is discharged from said cover via said at least one discharge outlet in said cover into said outer portion of said feed pan so as to fill said feed pan to a substantially greater extent than when feed is dispensed into the feed pan from the bottom end of said cover.

15. A feeder as set forth in claim 14 further having a ring which may be removably attached to said feed pan for increasing the depth and the diameter of said feed pan so as to allow larger birds to feed from said feed pan without undue loss of feed due to raking or billing of the feed out of the feed pan by the larger birds.

16. A feeder as set forth in claim 14 wherein said drop tube has a plurality of said apertures therein, and wherein said cover has a plurality of spaced generally downwardly directed openings therein, one for each of said apertures in said drop tube, each said generally downwardly directed opening in said cover receiving feed from a respective one of said apertures when said feeder is adjusted for discharging feed via said first feed flow path, said generally downwardly directed openings directing feed into said annular space between said drop tube and said cover, and wherein said cover further has a plurality of inclined surfaces thereon, one for each of said apertures in said drop tube, with said inclined surfaces alternating with said generally downwardly directed openings, each of said inclined surfaces receiving feed from a respective one of said apertures when said feeder is adjusted for discharging feed via said second feed flow path for directing said feed downwardly and radially outwardly to said second feed flow path outlet.

17. A feeder as set forth in claim 14 wherein said cover is vertically adjustable relative to said main body and relative to said feed pan so as to enable the selective adjustment of the amount of feed deposited into said feed pan from the open bottom of the cover when feed is delivered to the feed pan via said first feed path.

18. A feeder having a generally vertically extending main body for receiving feed, a feed pan disposed below said main body for receiving feed from said main body and for allowing poultry to consume said feed from said feed pan, said main body having at least one aperture for the discharge of feed therefrom, a cover spaced radially outwardly of said main body defining a vertically extending annular space between said cover and said main body, said cover having an open bottom, said cover being rotatably adjustable with respect to said main body between a first position in which feed from said at least one aperture is directed into said annular space for discharge of feed into said feed pan from said open bottom of said cover and a closed position, and said cover being vertically adjustable relative to said main body and relative to said feed pan thereby to enable the selective adjustment of the amount of feed deposited into said feed pan from the open bottom of said cover.

* * * * *